US005420852A

United States Patent [19]
Anderson et al.

[11] Patent Number: 5,420,852
[45] Date of Patent: May 30, 1995

[54] DIGITAL SWITCHING SYSTEM CONNECTING BUSES WITH INCOMPATIBLE PROTOCOLS AND TELEPHONE ANSWERING SYSTEM AND PRIVATE AUTOMATIC BRANCH EXCHANGE WITH INTEGRATED VOICE AND TEXTUAL MESSAGE RECORDING

[75] Inventors: Kent D. Anderson, Brodhead; Paul N. Henning, Madison; Raymond M. Jalbert, Madison; John F. Morley, Jr., Madison; Jacob P. Doornebos, Madison, all of Wis.

[73] Assignee: American Tel-A-Systems, Inc., McFarland, Wis.

[21] Appl. No.: 897,109

[22] Filed: Jun. 11, 1992

Related U.S. Application Data

[63] Continuation-in-part of Ser. No. 880,161, May 5, 1992, Pat. No. 5,341,368, and a continuation-in-part of Ser. No. 873,006, Apr. 24, 1992, Pat. No. 5,259,024, which is a continuation of Ser. No. 484,235, Feb. 23, 1990, Pat. No. 5,113,429, which is a continuation of Ser. No. 251,140, Sep. 29, 1988, Pat. No. 4,916,726.

[51] Int. Cl.[6] .................... H04L 12/40; H04L 12/52; H04M 3/50
[52] U.S. Cl. ................. 370/58.1; 370/85.11; 379/84; 379/88; 379/214; 379/218
[58] Field of Search .............. 379/67, 89, 93, 94, 379/96, 97, 202, 213, 214, 218; 370/58.1, 58.2, 58.3, 60, 60.1, 61, 67, 85.9, 85.11, 85.13

[56] References Cited

U.S. PATENT DOCUMENTS

| | | | |
|---|---|---|---|
| 4,503,288 | 3/1985 | Kessler | 379/67 |
| 4,523,055 | 6/1985 | Hohl et al. | 379/89 |
| 4,612,416 | 9/1986 | Emerson et al. | 379/88 |
| 4,696,026 | 9/1987 | Plouff | 379/34 |
| 4,739,509 | 4/1988 | Bourg | 379/93 |
| 4,755,932 | 7/1988 | Diedrich | 379/88 X |
| 4,785,408 | 11/1988 | Britton et al. | 379/88 X |
| 4,797,911 | 1/1989 | Szlam et al. | 379/92 |
| 4,799,144 | 1/1989 | Parruck et al. | 379/284 X |
| 4,805,207 | 2/1989 | McNutt et al. | 379/89 |
| 4,807,282 | 2/1989 | Kazan et al. | 379/284 |
| 4,837,798 | 6/1989 | Cohen | 379/88 |
| 4,860,339 | 8/1989 | D'Agosto, III et al. | 379/67 |
| 4,866,756 | 9/1989 | Crane et al. | 379/88 |
| 4,894,857 | 1/1990 | Szlam et al. | 379/67 |
| 4,916,607 | 4/1990 | Teraichi et al. | 379/98 X |
| 4,922,519 | 5/1990 | Daudelin | 379/67 |
| 4,939,771 | 7/1990 | Brown et al. | 379/67 |
| 4,959,855 | 9/1990 | Daudelin | 379/213 |
| 5,086,461 | 2/1992 | Thorn et al. | 379/230 |

FOREIGN PATENT DOCUMENTS 0192894 9/1986 European Pat. Off. ............. 379/93

OTHER PUBLICATIONS

"PC Dial Log", Operations Manual, Parts I and II, CMC International, Copyright 1983.
Brochure, 9 pages, American Telesystems Corp., Copyright 1986.

Primary Examiner—Thomas W. Brown
Attorney, Agent, or Firm—Antonelli, Terry, Stout & Kraus

[57] ABSTRACT

A digital switching system connecting buses with incompatible protocols and a telephone answering system and private automatic branch exchange with integrated voice and textual message recording is disclosed. The digital switching system (10) in accordance with the invention permits a digital switching matrix (12) having an input bus and an output bus to connect information on the input bus selectively to information on the output bus in response to control signals applied to switches of the switching matrix. A plurality of information systems (18, 20 and 22) each having a different bus protocol are electrically connected to the input and output buses of the switching matrix to permit information transmitted on a conductor of any of the information buses to be received by another conductor of any of the information buses through the input bus, the switching matrix and the output bus. A host processor controls the plurality of information systems. Furthermore, the host processor may be used to commonly control textual message and voice message recording systems within a telephone answering system and commonly control telephony functions and textual message and voice recording systems within a PABX.

57 Claims, 18 Drawing Sheets

Microfiche Appendix Included
(5 Microfiche, 401 Pages)

INDIVIDUAL SUBSCRIBER FILE

1. ACCOUNT #
2. CLIENT NAME
3. ANSWER PHRASE
4. MESSAGE FORM
5. OPERATOR PREFERENCE
6. DID #
7. # OF RINGS
8. SECURITY CODE
9. ON-OFF TIME OF SYSTEM
10. ACCOUNT INFORMATION (8 PAGES)
11. PROGRAMMED SERVICE OPTION(S)

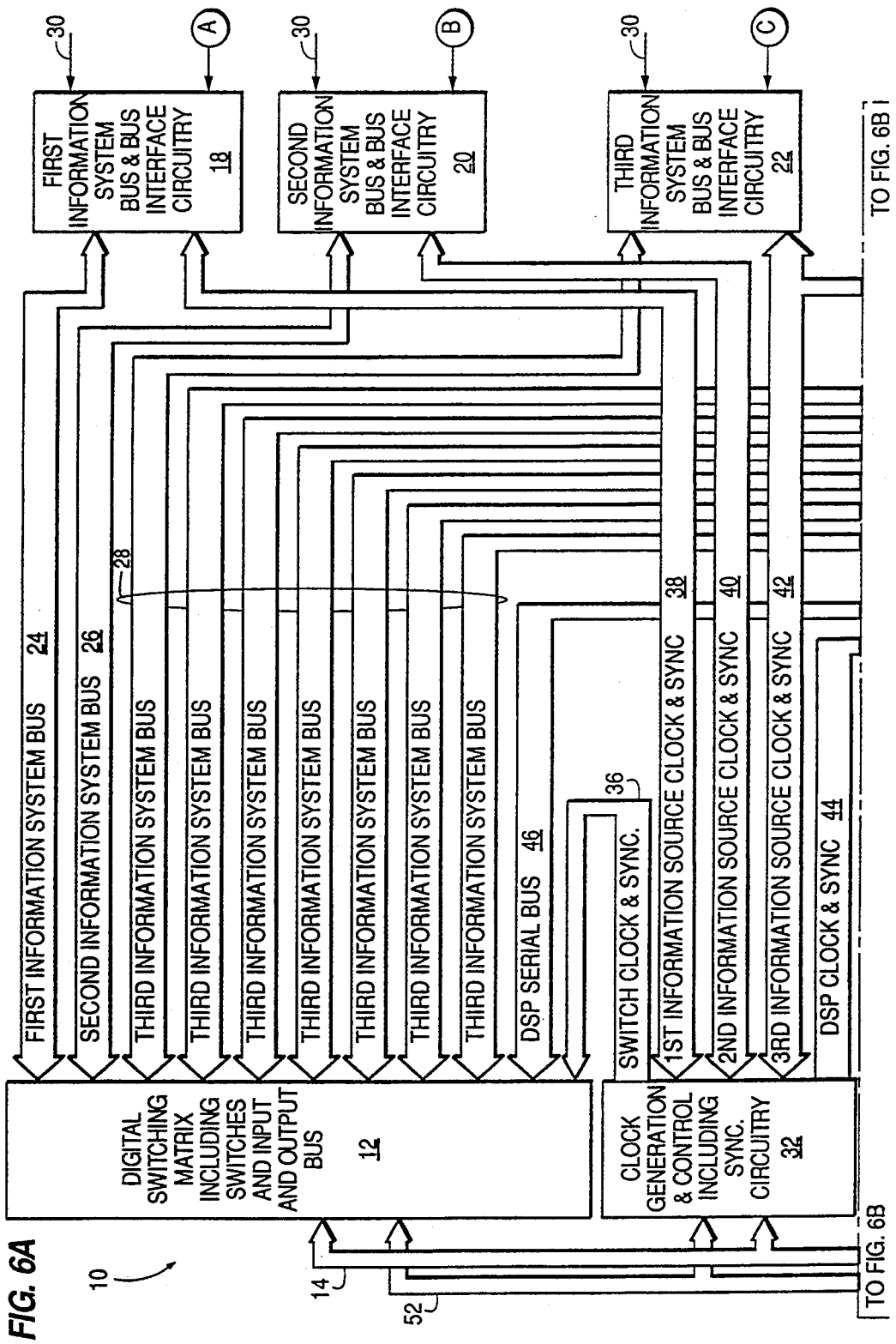

DIGITAL SWITCHING SYSTEM CONNECTING BUSES WITH INCOMPATIBLE PROTOCOLS AND TELEPHONE ANSWERING SYSTEM AND PRIVATE AUTOMATIC BRANCH EXCHANGE WITH INTEGRATED VOICE AND TEXTUAL MESSAGE RECORDING

CROSS-REFERENCE TO RELATED APPLICATIONS

This application is a continuation-in-part of U.S. patent application Ser. No. 07/880,191, filed May 5, 1992 entitled "Digital Switching System Interconnecting Buses with Incompatible Protocols", now U.S. Pat. No. 5,341,368. The above-referenced application and patent application Ser. No. 07/873,006, filed Apr. 24, 1992, entitled "Telephone Answering Service With Integrated Voice and Textual Message Storage", now U.S. Pat. No. 5,259,024, issued Nov. 2, 1993, which is a continuation of U.S. Pat. No. 5,113,429 issued on May 12, 1992 entitled "Telephone Answering Service With Integrated Voice and Textual Message Storage" which is a continuation of U.S. Pat. No. 4,916,726 issued on Apr. 10, 1990, entitled "Telephone Answering System With Integrated Voice and Textual Message Storage" are incorporated by reference in their entirety.

MICROFICHE APPENDIX

A Microfiche Appendix containing a source code listing of frames 241–641, (on five microfiche and a total of 401 frames), which may be used for programming the host processor which controls a telephone answering system having a textual message and voice recording system and an operator system, is attached hereto. Furthermore, the Microfiche Appendix in application Ser. No. 07/880,161, entitled "Digital Switching System Interconnecting Buses With Incompatible Protocols", filed May 5, 1992 contains a source code lising, which may be used for programming the control processor 16 and the digital signal processors 48 of FIG. 6. The attached Microfiche Appendix contains subject matter which is copyrighted. A limited license is granted to anyone who requires a copy of the program disclosed therein for purposes of understanding or analyzing the present invention but no license is granted to make a copy for any other purpose, including the loading of a processing device with code in any form or language.

TECHNICAL FIELD

The present invention relates to private automatic branch exchanges, telephone answering systems for use by telephone answering services and private telephone switching systems and to systems for connecting buses of information systems having incompatible protocols.

BACKGROUND ART

U.S. Pat. Nos. 4,916,726 and 5,113,429, which are assigned to the Assignee of the present invention, disclose a telephone answering service with integrated voice and textual message storage which is controlled by a programmable controller. The programmable controller controls a textual message recording system, a voice message recording system and telephony functions, including the control of a switching matrix which is interfaced to the telephone company through voice processors, to operator stations and to lines for patching telephone calls together. An interface connects the system to a remote input/output panel which includes multiple ports which may be connected to modems or to a PBX interface for connection to a PBX system with a serial port. The system, which has been marketed by the Assignee under the trademark PCMX ®, does not control the switching matrix of the PBX. Serial communications between the answering system and the PBX are necessary. Additionally, the switching matrix of the telephone answering system is controlled independently of switching functions controlled by the controller of the PBX and does not perform telephonic functions of the PBX.

FIG. 1 illustrates a block diagram of the Assignee's answering system disclosed in U.S. Pat. Nos. 4,916,726 and 5,113,429. The answering system 123 provides in a programmed personal computer 124, a textual messaging recording system 125, a voice message recording system 126 and an integrated control in the form of a programmed controller 127. The overall operation of the answering system 123 is controlled by the programmed controller 127. A suitable control program for implementing the functions of the textual message recording system 125, voice message recording system 126 and programmed controller 127 is contained in the attached Microfiche Appendix of the Assignee's above-referenced patents.

The program set forth in the attached Microfiche Appendix of the Assignee's patents is a real time multitasking program supporting multiple operators. The program supports an overall system control of the answering system and the control of recording of textual and voice messages implementing the voice recording and text recording systems. In the preferred form of the invention, the program is executed by a personal computer.

A DMA (direct memory access) circuit and memory 127' is controlled by the programmed controller 127 to control the transmission of data throughout the system over a transmission system 128 which preferably is the parallel digital data bus of the personal computer. All sources of analog data which are connected to the digital data bus are converted from analog to digital format by A to D converters. Each source data port which is connected to the digital data bus 128 addresses data to the memory in the DMA circuit and memory 127'. The programmed controller 127 then applies a destination address within the system to the data which is stored in the DMA circuit and memory 127' for transmission to the destination. Thereafter, the DMAcircuit controls the transmission of the data stored in the memory to the addressed destination data port connected to the digital data bus 128. Where necessary, the data at the addressed data port is converted to analog format by D to A converters. This form of data transmission is highly advantageous in that data transmissions between telephone input and output lines, the textual message recording system 125, the voice message recording system 126, and the operator station(s) 129 are by means of a high bandwidth digital data bus without requiring the placing of telephone calls or use of low bandwidth data communications. Suitable D to A and A to D converters in the D to A, A to D and A to A circuits 130 connect DID telephone lines 131 and telephone trunk lines 132 to the bus 128. A system storage is provided by disk 133. Printer 134 is connected to the bus 128 for providing conventional printed outputs regarding system operation. A plurality of operator stations 129 are connected to the digital data bus 128 which are operated by operators to provide operator assistance during operation of the system 123. An operator station headset control 135 is associated with each operator station 129 to permit operators at the operator stations to talk to telephone callers on the telephone lines 132 through an operator headset (not illustrated), operator headset control 135, line 136 and the analog to analog portion of the D to A, A to D and A to A circuits 130. The DID lines 131 are used conventionally to interface subscribers of a telephone answering service or a private telephone switching system with the telephone company. The at least one telephone trunk line(s) 132 couples the telephone answering system 123 to the telephone company to provide the telephone answering service with one or more check in telephone lines to obtain an up to date summary of the telephone calls which have been answered by the telephone answering service or a telephone connection to telephone circuits outside of a private telephone switching system to enable a summary of the telephone calls answered by the telephone answering system to be obtained.

The programmed controller 127 supports at least one operator station with display and keyboard 129 with support preferably being provided for a plurality of operator stations with display and keyboard. Each operator station with display and keyboard 129 is conventional. Each operator station with display and keyboard 129 is operated with an operator which provides live operator answering capability to telephone calls requiring operator intervention as discussed below. Moreover, the program listing contained in the above-referenced appendix of the Assignee's patents supports an operation in which each telephone call to be answered by the voice message recording system 126 has an operator answer the incoming telephone call and command that the call be answered under the control of the voice message recording system if the subscriber's service option described below with reference to FIG. 4 specifies that telephone calls should be answered with the voice message recording system. Preferably, the connection of the voice message recording system 126 to the telephone caller is automatically implemented by the control program interrogating the file of persons having telephone calls answered by the telephone answering system 123 to obtain the programmed service option which, if programmed for recording of telephone calls by the voice message recording system, causes the telephone call to be recorded without operator intervention.

The disk 133 functions as the system storage for the recorded textual messages, the recorded voice messages and the control program contained in the aforementioned attached Microfiche Appendix. Furthermore, the disk 133 stores individual subscriber files of persons having telephone answering services performed by a telephone answering service utilizing the telephone answering system 133 or a file identifying persons who have telephone calls answered by the telephone answering system in conjunction with a private telephone switching network. These files contain pertinent information regarding each person serviced by the telephone answering system to be used by the control program of the telephone answering system 123 and operators operating the operator station(s) with display and keyboard 129. This information is described below with reference to FIG. 4. Furthermore, each subscriber file contains a security code which must be inputted to the system to the telephone answering system to obtain a summary of telephone calls answered by the telephone answering system. Furthermore, each file contains the service options to be utilized when the telephone answering system 123 is automatically answering telephone calls without operator intervention. These service options include programmable times at which telephone calls are to be answered by use of the textual message recording system 125 and the voice message recording system 126.

The programmed controller 127 jointly controls the textual message recording system 125 and the voice message recording system 126 as follows. A telephone call which has been forwarded to the telephone answering system 123 as a consequence of activating telephone call forwarding to the telephone answering system is received on the DID lines 131 or on other telephone lines. The DID lines may be used for other purposes such as when a person directly dials the telephone answering system 123. The number which is called is decoded by the programmed controller 127 in a conventional fashion. The decoded number provides a pointer to the file in memory to identify the service option to be utilized in answering the incoming telephone call. This service option is programmable as a function of time. Accordingly, after identification of the particular file, the programmed controller 127 compares the current time with the time programmed of the service options to choose the service option to be used at the time of the incoming telephone call. Thereafter, the programmed controller 127 controls the connection of the incoming telephone call to one of the operator stations with display and keyboard 129 and the textual message recording system 125 thereafter controls the recording of textual messages transmitted by an operator at an operator station with keyboard 129 to the system memory 133 for recording or the voice message recording system 126 controls the connection of the incoming telephone call to the system memory 133 for recording in accordance with the programmed service option. Transmissions of textual messages between the operator station with display and keyboard 129 and the system memory 133 for recording are transmitted over the digital data bus 128. Transmissions of voice messages between a telephone line and the system memory for recording are transmitted over the digital data bus 128. Textual messages are generated by the typing of the message on the keyboard of the operator station with display and keyboard 129. The transmission of system data on the digital data bus 128 substantially speeds up communications between the textual message recording system 125, the voice message recording system 126, programmed controller 127, and operator stations with display and keyboard 129 in comparison to the prior art which placed telephone calls or used low bandwidth communications. Furthermore, the utilization of a single control program which program implements the textual message recording system 125 and the voice message recording system 126 and programmed controller 127 provides maximum flexibility in permitting the telephone answering system 123 of the present invention to be configured to the needs of different environments such as telephone answering services and private telephone switching networks.

FIG. 2 illustrates a block diagram of an embodiment 150 of the system disclosed in U.S. Pat. Nos. 4,916,726 and 5,113,429 and marketed by the Assignee under the trademark PCMX®. The embodiment 150 executes the control program listed in the above-referenced attached Microfiche Appendix of the Assignee's patents. It should be understood that the textual message recording system 125, voice mail recording system 126, program controller 127 and transmission system 128 have been omitted for the reason that these elements are implemented within the programmed host system described above with reference to FIG. 1. The AT compatible computer includes a clock calendar. A pair of serial ports 154 respectively couple the host system to the system modem 156 and to system printer 158. The serial ports 154 are standard serial ports used with the International Business Systems' AT computers. An interface 160 provides an interface between the host system 152 and the operator stations 162.

The interface 160 is connected to a remote input/output panel 164 having eight ports 166. Ports 1-3 are respectively connected to the second, third and fourth operator stations 162 to transmit data to the PC compatible computer and display contained in each of the operator stations. Ports 4-8 are connected to modems and other outputs as indicated by 168, such as a remote printer, alpha paging or a PBX interface to a PBX system having a serial port. The interface 160 is an intelligent input/output processor designed to implement different serial protocols. Handling of serial protocols by the interface 160 off loads processing overhead from the host system 152 which frees the host system for performing other tasks. Data compression capability may be implemented in the host system or in the interface 160 as a consequence of the interface having an 8088 microprocessor.

Four identical voice processing boards 170 (voice processors) provide a telephony interface of the host system with the telephone network. The voice processors 170 provide four loop start telephone lines 171. From the telephone company, the voice processors 170 have the characteristics of a telephone. The voice processors 170 implement normal functions such as ring detection, software controlled answering, DTMF and dial pulse output and detection capabilities. Furthermore, the voice processors 170 digitize incoming speech for storage on the system disk as well as playing back of previously stored data. The voice processors 170 contain firmware to compress digital data. Furthermore, the voice processors 170 have dual ported RAM to enable data to be transferred to the host computer. The voice processors 170 detect whether the telephone lines to which they are coupled are ringing, busy and off hook. The voice processors 170 are programmable to listen to tones if a frequency is specified. The voice processors 170 have audio outputs for a line which may be connected to an appropriate interface such as switch matrices 172 which are discussed below to allow an incoming telephone caller to talk to a live operator. An 80186 microprocessor is contained in each of the voice processors 170 to handle control functions. The computer in the host system contains software to communicate with the microprocessor of the voice processors 170 and control all of the required telephony functions. For DID telephone lines, a ring back cadence is provided from the hard disk 133 on all incoming DID telephone calls. Furthermore, the voice processors 170 provide busy signals, messages if a wrong number comes in, automated answering for persons who have voice mail, recording and playback of messages, automatic dial out so that an operator can be processing another telephone call while a first telephone call is being dialed and DTMF decoding for automated voice mail functions. Optional DID interfaces 174 permit the loop start lines 171 to be connected to DID trunks 178. The voice processors 170 may be a D/41 board manufactured by Dialogic Corporation of Parsippany, N.J.

The switch matrices 172 provide an operator audio interface to incoming telephone calls. Moreover, the switch matrices 172 are used for operator input to voice mail. Each of the switching matrices 172 contain an 8×8 analog crosspoint switch. The switch matrices 172 are connected to a station adaptor 178 having 8 output lines 179. In order to permit patching of two telephone calls together, the number of lines 179 connected to operator stations has been limited to four. Lines 1-4 of the station adaptor are connected to the remote operator stations 162 and to the operator station 180 which is directly supported by the host system. Lines 5-8 of the lines 179 of the station adaptor 178 are used for patching together of two telephone calls with the capability of the operator being able to interrupt the patched telephone calls. The switching matrices are Dialogic Corporation AMX/81 boards.

FIG. 3 illustrates the interconnection of the switch matrices 172 of FIG. 2. The bracketed lines "1st, 2nd, 3rd, and 4th" respectively indicate connections to the first, second, third and fourth voice processors 170 described above in FIG. 3. The telephone interface 160 is used to connect operators at the operator stations to the voice processors 170 described above. Thus, if a telephone call comes in on one of the lines from the telephone company to a voice processor 170, one of the cross points on the right-hand switching matrix is closed and the signal is transmitted to the left-hand switching matrix. The signal is transmitted through the telephone interface 160 to the operator. The combined effect of the switching matrices 172 is that they jointly function as a single 16×8 crossover matrix. At the present time, the right-hand telephone interface is not utilized.

FIG. 4 illustrates a memory map of data contained in an individual person's file which is stored in the system memory storage disk 133 of the answering system 123. It should be understood that the terminology "person" is intended to identify all persons who are serviced by usage of the answering system including, but not limited to, subscribers of a conventional telephone answering service as well as persons who have telephones associated with private telephone switches such as PBX switches. Suitable modifications may be made to this information to service persons whose telephones are answered by private telephone switches or other applications. The "account #" identifies the number assigned to the person's account. This number is utilized for purposes of billing and account identification. The "client name" is the name of the person whose telephone is being answered. The "answer phrase" is the phrase which is desired by the person to be used when the operator answers a telephone call for purposes of greeting the telephone caller in the appropriate manner. The "message form" is a form having one or more blanks in which information provided by the telephone caller is filled in to create a complete message which is read back to the person upon telephone call in on a check in line. The "operator preference" is programmable to automatically cause a certain operator station(s) to be called when a telephone call is incoming for the person. The operator preference permits operator stations to be listed to be eligible for telephone calls according to required or preferred telephone call eligibility groups or stations. The "operator preference" permits the person to have a particular operator to be utilized for answering the person's telephones. The "DID #" is the digits assigned to the person for telephone calls incoming on a block of DID lines 131 when the answering service has been activated to answer the person's telephone. The "DID #" may be three or four digits out of the block of digits provided in a DID trunk by the telephone company. The programmed controller 127 operates to decode the DID digits of an incoming telephone call for a person and utilizes those digits as a pointer to identify the individual file. Accordingly, the DID number functions as an address of pertinent information utilized for automatic operation of the telephone answering system such as when the person desires for telephone messages to be left by operation of the voice message recording system 126 without line operator intervention. The "# of rings" is a programmable variable which is the maximum number of times a person's telephone should ring before the answering service answers with an operator or to request a voice message generated by the voice message recording system 126. The "security code" functions as a password for screening incoming telephone calls so that only authorized persons can obtain a summary of messages recorded under the control of the textual message recording system 125 and the voice message recording system 126 stored in the system memory 133.

FIG. 5 illustrates a display screen 250 utilized by the operator stations of the answering system 123. The screen 250 is organized into six blocks described as follows. The first block 254 plays an important part in the answering system's ability to facilitate an operator answering telephone calls with the highest possible degree of information individualized for the particular needs of each subscriber. Block 254, under the control of the control program contained in the above-referenced attached Microfiche Appendix of the Assignee's patents, provides the operator with one or more characteristics pertaining to a current telephone call providing information of the current telephone call to the operator station. The characteristic(s) provided in block 254 inform the operator at an operator station prior to making a connection of information utilized by the operator to compose a voice sequence in answering the telephone call which is tailored to the precise nature of the telephone call. This characteristic of block 254 may generally be referred to as "point of origin" information pertaining to a current telephone call but it should be understood that the characteristics to be displayed in block 254 are not limited to "point of origin" information. In order to provide the maximum possible personalization of answering of a person's telephone call in a manner which reflects an extension of the person's own practices of answering the telephone, it is desirable to provide the operator with information pertaining to the origin of the telephone call such as if the person has initiated obtaining a playback of voice recorded telephone calls. For example, an operator's response in answering a telephone call placed to the operator station from the person that originates after connection to the voice message recording system to obtain the voice messages recorded in the system storage 133 is usually a request to the operator for a special message such as an emergency and need not be particularized to reflect how the person wishes its telephone to be answered for a telephone call being placed to the person. Alternatively, when a telephone call is placed to the operator station requiring the operator to answer the person's telephone in a manner in which the person would answer its own phone, it is highly desirable to have the operator utilize the answer phrase as described above with reference to FIG. 4 which would be of no benefit for a check in telephone call. Moreover, from the standpoint of operator efficiency, certainty in the operator's mind regarding the precise sequence to be utilized for answering all telephone calls to the operator station is greatly facilitated by the operator knowing the characteristics of all of the telephone calls to the operator station such as their point of origin from a person obtaining recorded voice messages. With the answering system's capability of permitting automatic check in to obtain voice messages recorded under the control of the voice message recording system 126, as well as permitting connection to the operator when check in telephone calls are received from the person, the characteristic(s) displayed in block 254 provides the operator with a maximum sense of how each telephone call to the operator station should be answered as a function of where and how it originated. The characteristic information displayed in block 254 also informs the operator if the telephone call is from two telephone calls which have been connected together as described above with reference to the lines 5-8 of the station adaptor 178 illustrated in FIG. 3.

Block 256 summarizes the three most current telephone calls which await answer. If the operator is a trainee or the telephone answering system is programmed for one telephone call at a time, one telephone call will show. The telephone call being answered is highlighted with the answering information regarding the point of origin block 254 described above. Block 256 displays traffic window detail such as if the current telephone call is ringing, a talking connection exists, the telephone call is on hold or it is a conference telephone call, the number of rings, is the telephone call a check in telephone call, the account number and the account name.

The windows 258 provide an index to enable the operator to quickly identify pertinent information contained in block 260 described below. Status detail is automatically applied and highlighted at the beginning of an index line with the statuses of "urgent" indicating an urgent message, "delivered" indicating a delivered message, "voice" indicating an unplayed voice message is attached, "played" indicating that a played voice message is attached and "delivered special" indicating that a special message has been delivered. The "what's where line" identifies the contents of the index windows 258 above and the information 260 below. This line is primarily used as a training key.

Information in the index windows is keyed to reflect certain information regarding the characteristics of block 254 described above.

With reference to block 256, a "ZERO" displayed as the state of the telephone call means that the telephone call has arrived because a telephone caller dialed 0 while in a playback of stored voice message to request an operator. A "0" telephone call has not been answered by an operator. "PTCH" means that the telephone call is patched and that the operator is not involved. "TK-1" means that the operator is talking to the first party in a two party telephone call. "TK-2" means the operator is talking to the second party in a two party telephone call. "DISC" means that the telephone call has been disconnected.

Block 260 is information obtained from 8 pages of account information described above. This information may be varied by the operator. Special messages are temporary information which is stored in a blank page having twelve 38 character lines. The history is information associated with each message and special. The history lists actions taken to deliver the message. The first eleven lines show the first eleven actions and the last line is overwritten to show the latest of more than twelve actions. The history actions are reflective of the history of the person's account regarding the taking of messages by the answering system 123.

PABX systems are commercially marketed which include voice mail capability. Newly developed systems have voice mail function within the PABX architecture.

PABXs manufactured by Mitel Corporation provide an operator prompt which is produced from decoding telephone calls to telephones within the exchange which is used by the operator at an operator station at which the operator answers the telephone call to provide the operator answering the telephone call with the prompt to personalize service or otherwise provide information to be used in the absence of a person answering the called telephone within the exchange.

U.S. Pat. No. 4,939,771 discloses an attendant controlled call delivery system which utilizes a local area network (LAN) for connecting attendant units to a data base unit which is connected to a PBX.

Local area networks typically have host software which drives a network basic input/output (BIOS) system which in turn drives a network interface board. The network interface board is typically connected by a thin COAX or 10 base -T conductor which is connected to a multiplexor. Multiple outputs of the multiplexor are coupled through the aforementioned thin COAX or 10 base -T to a network interface board which drives a network BIOS which drives the peripheral device. The aforementioned LAN configuration provides high speed communications from a host processor to a plurality of peripheral devices.

Digital switching systems have been developed which provide non-blocking digital switching in which pulse code modulation is used to digitize information such as voice channels to permit controllable switching of information on the inputs to the outputs of the digital switch. For example a total of 32 voice channels may be pulse code modulated and time division multiplexed so that selected channels on the inputs of the digital switch are connected to different outputs of the digital switch. The switching required to produce the time division multiplexed switching of different channels between selected inputs and outputs is produced by control switching signals applied to the digital switches of the switching matrix.

In the field of telephony numerous manufacturers make voice digitizing boards which convert individual channels (conversation) into a time division multiplexed PCM encoded format in which multiple bits encode respective samples of each channel. On a wire pair typically 24 or 32 different channels are encoded by assigning individual channels representative of a conversation to a particular time slot within a frame of the time division multiplexed PCM encoded information. Switching of the PCM information on a bus is controlled by a digital switch which permits the selective connection of individual channels through the public switched telephone network (PSTN) to particular telephone lines.

The voice digitizing products of manufacturers such as Dialogic Corporation, Natural Microsystems Corporation, Rhetorex and the assignee of the present invention, have incompatible bus protocols which prevent direct interconnecting of buses of systems made by these manufacturers. The buses utilized by the aforementioned manufacturers and others have several possible clock rates such as 1.544 MHz, 2.048 MHz, 4.096 MHz and different 8 kHz synchronization of the frame rate as provided by specifications of integrated circuits manufactured by National Semiconductor or Mitel Corporation and further synchronization signals which define superframes utilized for T1 service which are a combination of multiples of 6 basic frames at the 8 kHz frame rate. As a result of the diversity of the clock rates, synchronization and other timing signals utilized by the various manufacturers there is no compatible bus protocol for interconnecting information systems which have been made by the interconnection of boards provided by a particular manufacturer with an information system made by interconnecting boards from another manufacturer. As a result a user of a system having digitized voice currently is required to make difficult choices as to which manufacturers' products to purchase which limit the overall functional capability of a system and the ability to modify the system in the future as a consequence of the inability to interconnect subsystems formed from products manufactured by different manufacturers.

Circuit boards are marketed which may be inserted into the expansion slot of a standard PC such as a PC-AT to control different types of analog telephone ports. These boards provide analog telephone line port receptacles for connection to the PSTN. The analog ports may be for a station port which supplies battery feed capable of applying ring voltage to a line along with normal line status and control functions for the purpose of interfacing two telephones; a loop start port of the so-called "plain old telephone service" which includes all normal line status monitoring; a ground start port which provides a ground start line interface; a DID port which provides all known RS-464 and IEEE standard DID protocols including wink, immediate start as well as DTMF and pulse dialing; an E&M port which may be configured for type I or II signalling and a battery feed port which provides battery but cannot provide ring voltage. These circuit boards have programmable jumpers or switches which permit each of the ports of the circuit to be programmed to have the desired type of line characteristic. The disadvantage of this type of circuit board is that all of the circuits necessary for supporting the types of possible line interfaces which may be provided must be present on the board even though the customer may only want to use a fraction of the overall number of line type interfaces that are supported by the board. As a result, the expense of the circuit board is increased and further the number of analog lines which may be connected to the board is lessened as a consequence of the necessary electronics for supporting all of the lines taking up space which lessens the number of ports which may be on the board.

Another design of a circuit board for interfacing a PC with analog lines does not permit the programming of the characteristic of the line to which the circuit board is to be connected. Each circuit board of this type is hard-wired to support one or more types of analog line interfaces. As a result, this product is not programmable and may be only used for specific applications for specific connections to analog lines which prevents it from being reconfigured by the customers to interface with different types of analog lines.

DISCLOSURE OF INVENTION

The present invention is a digital switching system utilizing a digital switching matrix and further an information system having a plurality of connected information buses of different information systems which each have individual bus protocols which are incompatible and different from the protocols of the other buses of the remaining information systems that prevents communications directly between buses of the information systems. A host processor is coupled to each of the plurality of information systems for controlling the information systems with commands causing at least one of the information systems to transmit and at least one of the information systems to receive information by connecting the information bus of the transmitting and the information bus of the receiving information systems with a digital switching matrix. A control processor controls the digital switching matrix by generating control signals controlling switching of the switches of the digital switching matrix in response to commands from the host processor. The invention is particularly applicable to the interconnection of telephony systems having incompatible information buses transmitting information in the form of time division multiplexed PCM encoded digitized voice or data which are made from products of different manufacturers having different bus specifications. Individual telephone conversations, which are digitized by using time division multiplexed PCM encoding to produce multiple channels on pairs of conductors of the bus of the system, may be connected to other pairs of conductors on the bus within one of the connected information systems or to another information system through the switching matrix by suitable programming of the information systems and the control processor.

Control circuitry is provided, which is responsive to the control processor, for providing a master clock signal to the information systems which controls a rate of information transmission and reception on the buses by the information systems and further the generation of master synchronization signals for controlling framing and other master timing signals which are transmitted to the information systems to provide compatible systems clock, synchronization and control signals. The commands from the host processor control the generation of the master clock with the host processor commanding the information systems to control the transmission and reception on the information buses under the control of the master clock. The master clock may be synchronized to generate the clock signal with another signal provided on one of the information buses of the information systems to the control circuitry such as, but not limited to, a timing specification provided by the PSTN such as where T1 service is provided. Additionally, the control circuitry also provides the synchronization signals to the information systems which synchronize frames of information transmitted and received on the buses by the information systems.

In a preferred application of the present invention the host processor is a PC and the control processor is commanded by the host processor to perform the necessary switching interconnections of the switching matrix in order to ensure that appropriate connections are made between the buses of the information systems which are connected to the switching matrix which result in the transmission and reception of information as commanded by the host processor to the information systems as a consequence of the commands issued from the host processor to the information systems. As a result of the commands controlling the connection of the buses from the incompatible information systems through the switching matrix and the generation of a master clock signal controlling the rate of transmission of information on the buses as well as synchronization signals, the information systems individually which have incompatible bus specifications are made compatible by the supplying of common clock and synchronization information to all systems. This ensures the compatibility of information transmission on and between the buses of the information systems and the appropriate signal paths through the switching matrix being established between the buses as a consequence of the switching of the switching matrix being under the control of the commands issued by the host processor.

The invention provides distinct advantages over the prior art which does not permit incompatible information systems to be interconnected through their buses as a consequence of incompatible bus protocols. As a result, digitized voice and other forms of digitized information, such as ISDN, may be transmitted between incompatible digital information systems by the supplying of appropriate commands from a host processor such as a PC to the control processor which controls the generation of centralized clock and synchronization information which is transmitted to the individual information systems to provide their clock and synchronization signals. As a result of using a conventional PC and a processor such as a microprocessor, which is part of a circuit board that is connected to the PC as a peripheral device which is controlled by the PC to control the digital switching matrix and the control circuitry to generate the common system timing, the overall cost of the system is reduced while permitting the interconnection of otherwise incompatible information systems in conventional usage in applications such as telephony where digitized voice products are provided by diverse manufacturers of voice digitizing circuit boards used in combination with digital switches to provide diverse telephonic services through customers connected to the PSTN.

The digital switching system further includes a telephone answering system having a voice message recording system for recording voice messages provided by telephone calls to telephones being answered by the telephone answering system; a textual message recording system for recording textual messages provided by an operator who answers telephone calls made to telephones being answered by the telephone answering system and wherein the host processor decodes telephone calls to be answered by an operator to identify a characteristic stored in an answering system memory to be used in answering a telephone call, causes the identified characteristic to be displayed by a display device at an operator station at which the operator answers the telephone call to provide the operator answering the telephone call with the characteristic for use in answering the telephone call at the operator station, controls the recording of messages by the telephone answering system and controls reproduction of the recorded messages to provide caller access to messages recorded by the voice message recording system and access through an operator to messages recorded by the textual message recording system. The host processor may be under the control of a single control program. The characteristic may be any of the characteristics as described below with reference to the private automatic branch exchange and telephone answering system of the present invention. The host processor may provide a voice synthesized message as described below with respect to the private automatic branch exchange and telephone answering system of the present invention. The host processor may provide a caller with the choice of playing back individual voice messages or requesting an operator to read back individual textual messages. The decoding of the telephone call to be answered comprises decoding of digits of a number called by a telephone call which digits function as a pointer to a file in the answering system memory storing the characteristic. Preferably the controller is under the control of a single control program.

The invention further is a private automatic branch exchange having a plurality of telephones which controls telephony functions of the telephones and a telephone answering system for providing textual messages and voice messages produced by the telephone answering system answering telephone calls to the telephones. The invention utilizes a controller, which is preferably under the control of a single control program preferably executed by a PC, to control operation of the exchange to control the telephony functions between telephones within the exchange and the telephony functions of the telephones within the exchange to and from the exchange and the operation of a voice message recording system for recording voice messages provided by telephone calls to telephones within the exchange and a textual message recording system for recording textual messages provided by an operator who answers telephone calls made to telephones within the exchange. The integration of the private automatic branch exchange and the telephone answering system into a unified integrated system with common control which is controlled by a controller which executes a control program provides a highly operationally efficient and lower cost system which provides in private automatic branch exchanges the capability previously provided by the connection of a separately controlled telephone answering system having textual message and voice message recording capability as described above with reference to the Assignee's patents through serial communications with the private automatic branch exchange. The use of a single system controller to provide common control for controlling telephony functions of telephones within the exchange and between telephones within the exchange and telephony functions of the telephones within the exchange to and from the exchange and telephone answering capability including both voice and textual message recording and reproducing capability permits modifications to be made to overall system operation involving the switching functions of the private automatic branch exchange and the telephone answering service to be made efficiently and at a lower cost when compared to a PABX and telephone answering system which is connected and separately controlled as a consequence of the control program of the host processor executing text messaging modules, voice messaging modules, PABX modules, network (LAN) interface modules and operator communication modules. The unified and common system control, including the foregoing modules, which may be under the control of a single control program, provides state of the art telephony functions for telephones within a PABX and state of the art answering service functions involving integrated voice and textual message recording and reproduction with operators.

A private automatic branch exchange having plurality of telephones which controls telephony functions of the telephones and a telephone answering service system for providing textual messages and voice messages provided by the telephone answering system answering telephone calls to telephones in accordance with the invention includes a voice message recording system for recording voice messages provided by telephone calls to the telephones and answered by the telephone answering system; a textual message recording system for recording textual messages provided by an operator who answers telephone calls made to the telephones which are answered by the telephone answering system; and a controller decoding telephone calls to telephones to be answered by an operator to identify a characteristic stored in an answering system memory to be used in answering a telephone call, causing the identified characteristic to be displayed by a display at an operator station at which the operator answers the telephone call to provide the operator answering the telephone call with the characteristic for use in answering the telephone call at the operator station, controlling the recording of messages by the telephone answering system, controlling reproduction of the recorded messages to provide caller access to messages recorded by the voice message recording system and access through an operator to messages recorded by the textual message recording system and controlling operation of the exchange to control the telephony functions of the telephones. The controller may be a programmed computer which is a PC under the control of a single control program. A local area network connects a plurality of operator stations to the controller for transmitting information between the controller and the stations. The characteristic may be information used for composing a voice sequence by the operator in answering the telephone call at the operator's station, an indication that the telephone call has occurred in response to reproduction of a voice message stored in the answering system memory, an indication that the telephone call is a check-in call when an emergency message has been recorded and any attempt to reach a person whose telephone is being answered by the answering system to deliver the emergency message has been unsuccessful, or an indication that the telephone call is a check-in call. The controller may provide a voice synthesized message summarizing textual and voice messages stored in the answering system memory, the synthesized message after a caller requesting a summary has provided a security code which enables the playing of the synthesized message, a caller with a choice of playing back individual voice messages, or a caller with a choice of requesting an operator to read back individual textual messages. The decoding of the telephone call to be answered comprises decoding of digits of a number called by the telephone call which digits function as a pointer to a file in the system memory storing the characteristic. The single control program may be a real time multitasking program supporting multiple operators at multiple operation stations. Communications between the recording systems and the controller are over a digital data bus of a computer.

The private automatic branch exchange and telephone answering system of the invention further includes a digital switching matrix having an input bus and an output bus with information on the input bus being selectively connectible to information on the output bus in response to control signals supplied to switches of the switching matrix; a plurality of information systems with each information system having an information bus for transmitting and receiving information using a protocol which is different from a protocol used by the information bus of each of the information systems with the information buses of the information systems being electrically connected to the input and output buses of the matrix to permit information transmitted on a conductor of any of the information buses to be received by another conductor of any of the information buses through the input bus, the switching matrix and the output bus, and wherein the controller is coupled to each of the plurality of information systems for controlling the information systems with commands causing at least one of the information systems to transmit and at least one of the information systems to receive information using the information bus of the transmitting and the information bus of the receiving information systems, the switching matrix in the input and output buses; and a control processor, responsive to commands from the controller, generating the control signals controlling switching of the switches of the digital switching matrix. Information transmitted and received on the information bus is encoded in a pulse code modulation format to provide a plurality of channels of information with each channel being time division multiplexed. The channels of information may contain audio voice information. At least one of the information systems is connected to a public switched telephone network and the network provides a timing reference to the switching system used to generate a master clock signal by control circuitry to control a rate of information transmission and reception on the buses by the information systems. The controller transmits commands to a plurality of the information systems and to the control processor to cause information to be transmitted from the bus of one of the information systems through the digital switching matrix for receipt by the bus of another one of the information systems. The controller transmits commands to one of the information systems and to the control processor to cause information to be transmitted and received by the bus of the information system receiving the command through the switching matrix. The controller transmits commands to at least one of the information systems and to the control processor to cause a plurality of channels of information to be transmitted from the bus of at least one of the information systems through the switching matrix to the bus of at least another one of the information systems. The controller transmits commands to a plurality of the information systems and to the control processor to cause the plurality of channels of information to be transmitted from the bus of at least one of the information systems through the switching matrix to the bus of another at least one of the information systems. The controller transmits commands to the plurality of information systems and to the control processor to cause full duplex communications between buses of at least two of the information systems through the switching matrix. Control circuitry is provided, which is responsive to the controlled processor, for providing a master clock signal to the information systems which controls a rate of information transmission and reception on the buses by the information systems. The commands control the generation of the master clock signal with the controller commanding the information system to control the transmission and reception of information on the information buses under the control of the master clock signal. The master clock signal may be synchronized with another signal provided on one of the information buses of the information systems. The control circuitry also provides synchronization signals to the information systems which synchronize frames of information transmitted and received on the buses by the information systems. The commands control the generation of the synchronization signals with the controller commanding the information systems to synchronize the transmission and reception of frames on the information buses under the control of the synchronization signals.

BEST MODE FOR CARRYING OUT THE INVENTION

Figure 6B:
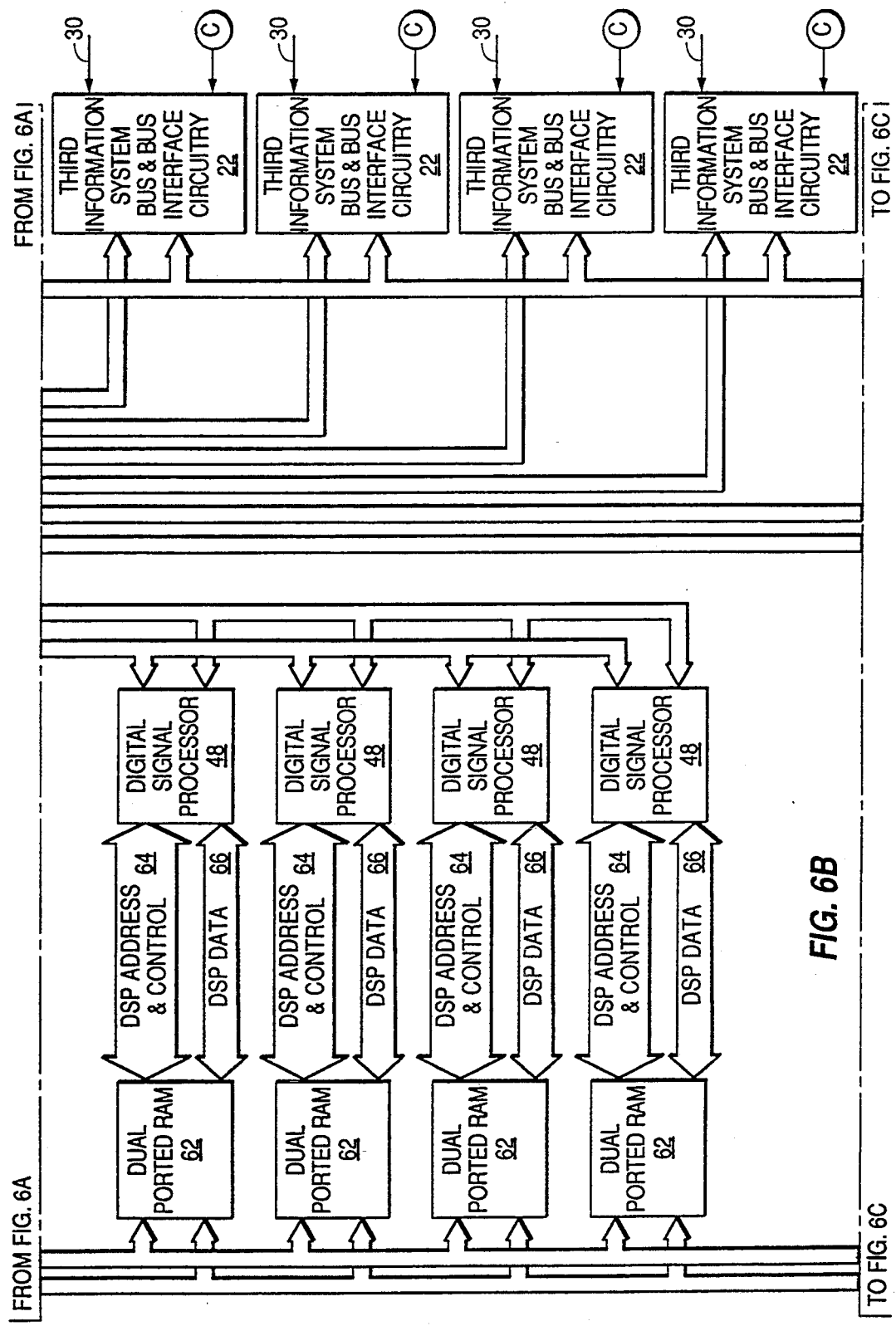
FIG. 6 illustrates a block diagram of a digital switching system and telephone answering system in accordance with the present invention.
Figure 6C:
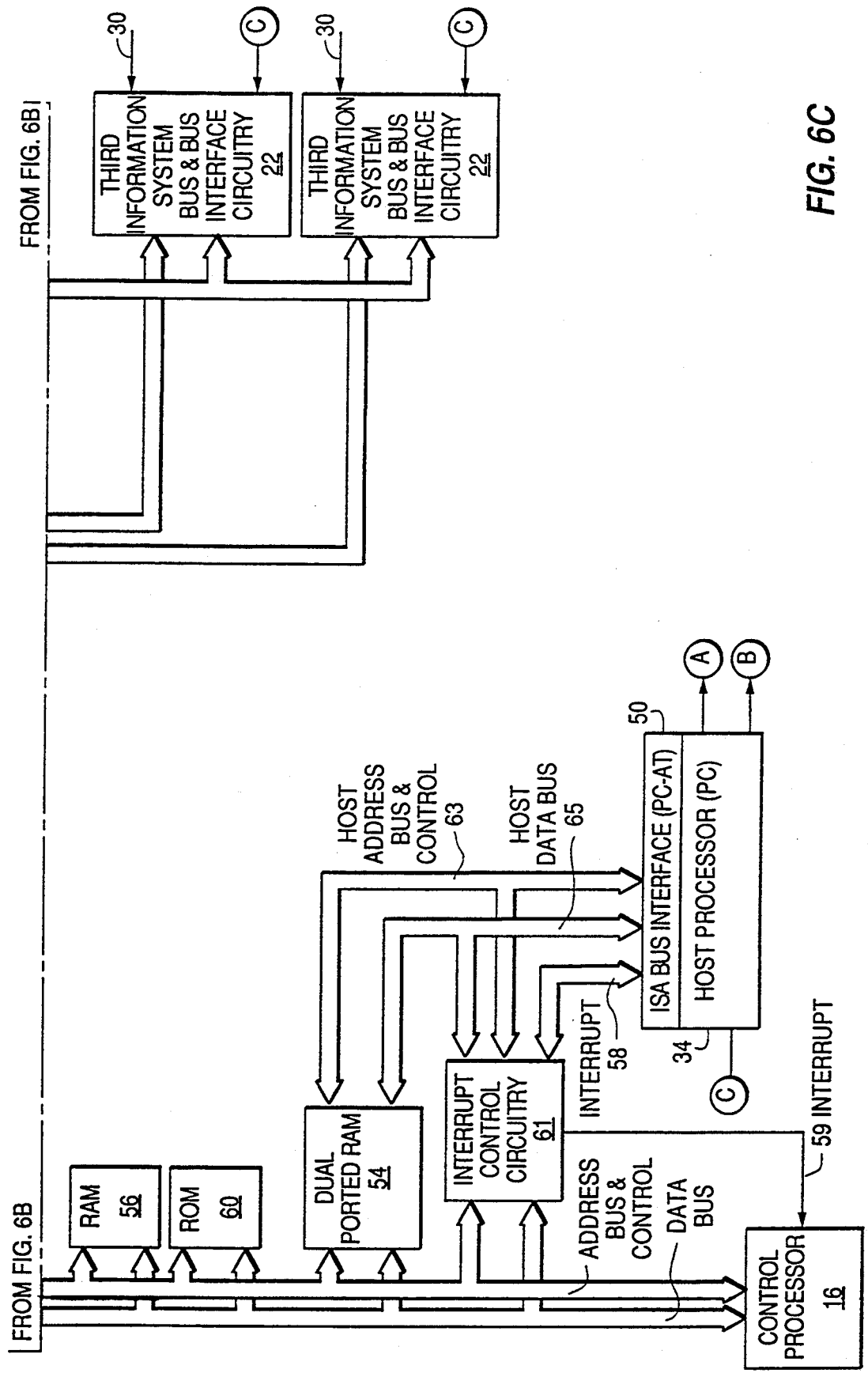

FIG. 6 illustrates a block diagram of a digital switching system 10 in accordance with the present invention. A digital switching matrix, switches and input and output buses 12 are the principal switching element of the digital switching system. The input bus and the output bus is conventional and is not separately illustrated. The digital switching matrix functions such that information on the input bus is selectively connectable to the information on the output bus in response to control signals applied to the switches of the switching matrix by control bus 14 which is connected to a control processor 16 which is described in detail below. A plurality of information systems, which are respectively identified as first, second and third information systems 18, 20 and 22, are connected to the digital switching matrix, switches and input and output buses 12 respectively by a first information system bus 24, second information system bus 26 and third information system bus 28. It should be understood that the present invention is not limited to the interconnection of any particular number of information systems and buses with the first, second and third information systems 18, 20 and 22 and first, second and third information system buses 24, 26 and 28 only being representative of possible information systems and buses which may be lesser or greater in number than the three information systems and buses as illustrated. The first information system 18 in a preferred embodiment of the invention is representative of digital voice processing circuitry manufactured by Dialogic Corporation. The second information system 20 in a preferred embodiment of the invention is representative of digital voice processing circuitry manufactured by Natural Microsystems. The third information system 22 in a preferred embodiment of the invention is representative of a group of interconnected line interface boards as described in conjunction below in FIGS. 8-13 which are manufactured by the assignee of the present invention. Inputs 30 are representative of connections between the PSTN and the configuration of circuits which form a complete information system such as a telephony system comprised of interconnected circuit boards for digital processing and switching of audio such as voice communications or data for transmission by protocols such as, but not limited to, ISDN. The digital switching matrix, switches and input and output buses 12 may be implemented by the connection of a plurality of Siemens multi-point switching and conferencing integrated circuits PEB 2245. Each integrated circuit of the digital switching matrix, switches and input and output buses 12 may switch any of 512 time and space division multiplexed input channels to any of 256 time and space division multiplexed output channels to provide PCM encoding. The inputs are connected in parallel to form a 512 channel by 512 channel switching matrix. Each integrated circuit is capable of performing multiple channel conferencing in which several input channels are cross-connected and coupled to appropriate output channels. The conferencing capability of the aforementioned integrated circuits is limited to 64 inputs combined in a maximum of 21 conferences. It should be understood that the present invention is not limited to any particular configuration or operation of the digital switching matrix, switches and input and output buses 12. The first information system bus 24, the second information system bus 26 and the third information system bus 28 each have distinct, unique, different and incompatible protocols which are incompatible with the protocols of the other buses which prevents direct connection of the buses into one system. As a result, the buses 24, 26 and 28 may not be directly connected to transfer information from one information system 18, 20 and 22 to another information system relying upon the timing including clock signals and synchronization signals generated by any one of the information systems. The digital switching matrix, switches and input and output buses 12 provide the capability of connecting conductors of each of the individual first information system bus 24, second information system bus 26 and third information system bus 28 to other conductors of that same bus or alternatively to conductors of another one of the buses and time division multiplexed information, such as voice channels, from one bus 24, 26 and 28 to another bus. The switching connections necessary to connect the input and output buses of the information on the input bus to the output bus of the digital switching matrix to provide appropriate connections between conductors of a single bus 24, 26 and 28 or between the buses is controlled by the control signals applied on the control bus 14 by the control processor 16.

The telephony industry has been characterized by diverse products each developed to provide digital voice processing utilizing time division multiplex PCM encoding. However, the manufacturers of these products have not developed a universal protocol which permits the interconnection of systems each individually configured with one manufacturer's products by bus interconnections to systems configured with another manufacturer's products. The present invention provides the capability of interconnecting information systems through buses which have incompatible protocols which have not been designed to be interconnected. The digital switching matrix, switches and input and output buses 12 provide connections between the conductors of the buses 24, 26 and 28 under the control of the control processor 16. Clock generation and control circuitry 32, which is controlled by the control processor 16, provides a master clock signal to the information systems 18, 20 and 22 which controls a clock rate of information transmission and reception of time division multiplexed PCM encoded information on the buses 24, 26 and 28 by the information systems and further controls the generation of necessary synchronization signals which synchronize the transmission and reception of frames of the time division multiplexed PCM digitally encoded information produced by the information systems on the information buses. In a preferred embodiment where the first, second and third information systems 18, 20 and 22 are respectively made from circuits supplied by Dialogic, Natural Microsystems and from the line interface circuits as described below in conjunction with FIGS. 8-13 of the assignee, a 1.544 MHz, a 2.048 MHz clock signal and a 4.096 MHz clock signal, an 8 kHz synchronization pulse marking the beginning of frames conforming to National Semiconductor timing specifications which may be used for information systems made from circuits supplied by at least the assignee, an 8 kHz synchronization pulse marking the beginning of frames conforming to Mitel timing specifications which may be used for an information system configured from Natural Microsystems circuits and synchronization signals which define a superframe used for T1 service which marks multiples of 6 basic frames. Additionally, the clock generation and control including sync circuitry 32 may be synchronized to an external timing reference from one of the information systems 18, 20 and 22 or from a source external to the information systems such as PSTN timing for T1 service used to generate the master clock signal to control the clock rate and timing of frames of information transmission and reception on the buses by the information systems. In this circumstance the master clock signal and synchronization signals may be synchronized to any external frame synchronization time reference. The external timing reference is routed to the clock generation and control including sync circuitry 32 by control of the control processor 16. Removal of the external clock reference causes the clock generation and control including sync circuitry 32 to revert to providing internally generated timing signals. Each of the information systems 18, 20 and 22 may provide the external timing reference through their connection to the PSTN which results in the timing reference being fed to the clock generation and control including sync circuitry 32 through the control processor 16 as described above. In any event, the clock generation and control including sync circuitry 32 supplies a common clock, synchronization and any other timing signals to some or all of the information systems 18, 20 and 22 either by means of signals generated as a consequence of the control of the control processor 16 as receiving commands from the host processor 34 as described below which also controls the switching connections produced by the digital switching matrix, switches and input and output buses 12 and the functioning of the first, second and third information systems 18, 20 and 22 as operating to transmit or receive information through the switching matrix and input and output buses or from an external source such as T1 timing.

The host processor 34 is coupled to each of the information systems 18, 20 and 22. The host processor 34 controls the information systems with commands causing at least one of the information systems 18, 20 and 22 to transmit and at least one of the information systems to receive information using the information system buses 24, 26 or 28, the switching matrix, switches and input and output buses 12. The different functions of the system 10 which are controlled by the host processor 34 are specified by a command set inputted from the host processor. The mnemonics of the command set are not discussed herein and may be varied. The control processor 16 is responsive to the commands issued from the host processor 34, which may be a PC and preferably may be PC-AT, for generating the control signals outputted on the bus 14 to the digital switching matrix of the digital switching matrix, switches and input and output buses 12 for controlling the switching of the switches in the switching matrix and the generation of the clock signals and synchronization signals and any other timing signals or control signals produced by the clock generation and control including sync circuitry 32. Suitable control programs for the preferred control processor 16, and digital signal processors 48 described below are respectively contained in frames 1–207 and 208–240 in the attached microfiche Appendix when the processor is the Hitachi 64180 and the digital signal processors are Analog Devices ADSP 2101. The clock generation and control including sync circuitry 32 is connected to the digital switching matrix, switches and input and output buses 12 by the switch clock and sync bus 36. Similarly the clock generation and control including sync circuitry 32 applies a common clock signal and synchronization signals respectively to at least some and in many applications all of the first, second and third information systems 18, 20 and 22 through the first information system clock and sync bus 38, the second information system clock and sync bus 40 and the third information system clock and sync bus 42. Finally, the clock generation and control including sync circuitry 32 produces clock and sync signals, which are applied through the DSP clock and sync bus 44, to a plurality of digital signal processors 48 as described below. A DSP serial bus 46 connects the digital switching matrix, switches and input and output buses 12 with the digital signal processors 48. The information transmitted on the first, second and third information system buses 24, 26 and 28 is preferably encoded in time division multiplexed pulse code modulated format to provide a plurality of channels of information which may be for example twenty-four or thirty-two in number without limitation with each channel being time division multiplexed in frames. In a preferred embodiment of the present invention, the PCM encoding of information channels by time division multiplexing is digitally encoded audio provided by the information systems 18, 20 and 22 which are made from circuits manufactured by manufacturers such as Dialogic, Natural Microsystems and the assignee of the present invention as described below. It should be understood that the invention is not limited thereto and may for example receive information in the form of data coming from the PSTN in an ISDN format. The host processor 34 controls both the local processor 16 and the first, second and third information systems 18, 20 and 22 through commands. The commands are decoded by the first, second and third information systems 18, 20 and 22 to control which of the information systems is transmitting information under control provided by the clock generation and control including sync circuitry 32 through the digital switching matrix and input and output buses 12 to the receiving information system. It should be understood that the information systems 18, 20 and 22 may be connected through the digital switching matrix, switches and input and output buses 12 under the control of the control processor 16 which in turn is controlled by the host processor 34 for controlling the digital switching matrix and input and output buses and the clock generation and control including sync circuitry 32 to cause conductors or information of one of the information system buses 24, 26 and 28 to be connected to other conductors or information in the same information system bus so that interconnects may be made in the same information system or to cause conductors or information of one of the information system buses to be connected to conductors or information of another of the information system buses. The aforementioned operation permits the connection between information systems to provide connection of buses which each have protocols which are incompatible with the protocols of the buses of the other information systems when operating within each of their respective information systems with timing supplied internally to the information system 18, 20 and 22 for controlling information transfer on its information system bus 24, 26 and 28.

To perform the diverse foregoing functions, the host processor 34 transmits commands to a plurality of the information systems 18, 20 and 22 and to the control processor 16 to cause information to be transmitted from the information system bus 24, 26 or 28 of one of the information systems 18, 20 or 22 through the digital switching matrix, switches and input and output buses 12 for receipt by the bus of another one of the information systems. Alternatively, the host processor 34 transmits commands to one of the information systems 18, 20 and 22 and to the control processor 34 to cause information to be transmitted and received by the bus of the information system(s) receiving the command through the digital switching matrix, switches and input and output buses 12. Furthermore, the host processor 34 transmits commands to at least one of the information systems 18, 20 and 22 and to the control processor 16 to cause a plurality of channels of information which are produced by the time division multiplexed PCM encoding to encode each channel in a multiple bit format such as 8 bits per channel to be transmitted from at least one information system bus 24, 26 and 28 of the information systems through the digital switching matrix, switches and input and output buses 12 to at least one bus of at least one of the information systems. Moreover, the host processor 34 transmits commands to a plurality of the information systems 18, 20 and 22 and to the control processor 16 to cause the plurality of channels of information which are encoded in the time division multiplexed PCM format to be transmitted from at least one information system bus 24, 26 and 28 of one of the information systems 18, 20 and 22 through the digital switching matrix, switches and input and output buses 12 to at least one information bus of another of the information systems. Additionally, the host processor 34 transmits commands to a plurality of information systems 18, 20 and 22 and to the control processor 16 to cause full duplex communications between information system buses 24, 26 and 28 between buses of at least two of the information systems through the switching matrix. Duplex communications are achieved by the setting of transmitting and receiving signal paths from at least a pair of information systems 18, 20 and 22 through the digital switching matrix, switches and input and output buses 12.

The clock generation and control including sync circuitry 32 is responsive to the control processor 16 to provide a master clock signal to the information systems 18, 20 and 22 which control a rate of information transmission and reception on the information system buses 24, 26 and 28 by the information systems. The commands provided by the host processor 34 control the generation of the master clock with the host processor commanding the information systems 18, 20 and 22 to control the transmission and reception of information on the information system buses 24, 26 and 28 under the control of the master clock. The master clock may be synchronized from a timing reference from one of the information systems 18, 20 and 22 or an external timing reference not under the control of the host processor 34 such as that provided by T1 service through the connection 30 to the PSTN. The clock generation and control including sync circuitry 32 also provides the synchronization signals which synchronize frames of the time division multiplexed PCM encoded information transmitted and received on the buses by the information systems 18, 20 and 22. The commands from the host processor 34 control the generation of the synchronization signals with the host processor commanding information systems 18, 20 and 22 to synchronize the transmission and reception on the information system buses 24, 26 and 28 under the control of the synchronization signals. A PC interface 50 interfaces the control processor 16 to the host processor 34. Preferably the interface 50 is an ISA bus interface which is in accordance with standards for a PC-AT. The bus interface 50 supports shared interrupts and uses both the input/output and memory address spaces on the host address bus and control 63 and the host data bus 65 of the host processor 34. The bus interface 50 provides communications between the host processor 34 and the control processor 16. Write-only input/output locations are used in controlling interrupt generation and memory base addresses. The input/output base address is switch selectable in hexadecimal respectively at input/output addresses between sequential hexadecimal addresses 0200–0370 which jump in increments of 0010 in hexadecimal address locations. Additional circuit boards within the system 10 such as the third information system 22 share interrupts mapped to the above-described input/output addresses. The base input/output address is used to reenable the interrupt control circuitry 61 that generates interrupts 58 to the host processor 34 by the host processor writing to the base input/output address after each interrupt is serviced. The base memory address for the dual ported RAM 54 of the system 10 with respect to the host processor 34 is set by the host processor 34 writing to the base input/output address plus 1. Data bits D0–D7 on the host data bus 65 map to the address bits A15–A22 of the host address bus and control 61 to set aside 32K address space for the system 10. For example to map the dual ported RAM 54 into base address location D0000 in hexadecimal of the host processor 34, data byte 1A in hexadecimal would be written to the base input/output address plus 1. There is no hardware to prevent mapping into memory below 640K. On power-up the dual ported RAM 54 cannot be accessed by the host processor 34. A jumper switch (not illustrated) may be used to control the mapping of the dual ported RAM 54 with respect to address bit A23 on the host address bus and control 63. When this jumper switch is installed, address bit A23 must be high to access the board, in which case the board is mapped into memory above 16M. The dual-ported RAM 54 may have 2K of memory with the address for the system 10 being mapped into 32K the base memory by the previously described input/output strobe. The ISA bus interface (PC-AT) 50 may contain a hex switch not illustrated to determine the 2K address space within the 32K of base memory used by a particular circuit board with the hex switch having hexadecimal settings 0-F with each hexadecimal value representing a multiple of 2K that is added to the base address of the system as determined by the previously described input/out strobe.

The shared interrupt allows the control processor 16 to generate an interrupt to the host processor 34 by writing to the dual-ported RAM address 54 of 0000 in hexadecimal. The interrupt is cleared when the host processor 34 writes to location 0000 in hexadecimal and also writes to the input/output base address. The host processor 34 can generate an interrupt to the control processor 16 by the writing of 0001 in hexadecimal into the dual-ported RAM 54. The control processor 16 clears the interrupt by writing to 0001 in hexadecimal. Interrupt requests are generated by the interrupt control circuitry 61 and are issued to the host processor 34 on the interrupt lines 58 and are issued to the control processor 16 on the interrupt line 59.

The system 10 supports the shared interrupts provided in the PC-AT Technical Manual as follows: When address 0 of the dual-ported RAM 54 is written into, an interrupt is generated (edge-triggered). If more than one circuit board such as other boards in a third information system 22 attempts to generate the interrupt, only one interrupt is actually generated. Furthermore, if one board generates an interrupt and another board tries to generate an interrupt before the first one is serviced, the second interrupt will not occur until the interrupt circuitry is rearmed. The interrupt service routine must determine which board is interrupting. After finding the appropriate board, it must perform all software tasks required in servicing the interrupt. When these tasks are completed the interrupt service routine must write to location 0 of the dual ported RAM 54 to enable the board to generate another interrupt. The last step in the process is to write into the input/output base address shared by all boards. This enables the interrupt generating circuitry on all boards. If any interrupts are pending (i.e. from a second board needing service before the first board's interrupt service routine is complete), another interrupt will be generated at this time and the normal interrupt service routine functions should be executed. This methodology allows only one board to be serviced in a given interrupt service routine. However, even if all of the boards in the system 10 request an interrupt simultaneously, a fresh interrupt is generated for each board until all have been serviced. If desired, the interrupt service routine can service all boards within one call to the interrupt service routine. If this method is chosen, the input/output strobe should not be generated until the last board is serviced. This will prevent multiple interrupts from occurring. The combination of the dual-ported RAM 54 and the interrupt control circuitry 61 provides a complete communication mechanism which allows the control processor 16 to send messages to the host processor 34 and the host processor to send messages to the control processor. These messages provide all the control functions to a particular board to interface the host processor 34 with a control processor 16.

The control processor 16 may be any suitable microprocessor but a Hitachi 64180 is utilized in conjunction with the source code in the microfiche Appendix at frames 1-207 of the Appendix to application Ser. No. 07/880,161. The control processor 16 provides access to the dual-portedRAM 54, RAM 56 and ROM 60. In the aforementioned Hitachi microprocessor a total of 64K of memory is provided. All device specific functions are implemented via the input/output interface of the control processor 16. These communications include communications with the digital signal processors 48, the clock generation and control including circuitry 32, switching control of the digital switching matrix, switches and input and output buses 12 and serial input/output communications. The ROM 60 stores the application program. The RAM 56 is used for variable storage and temporary information. The dual-ported RAM 54 provides the interface to the host processor 34 as described above. The control processor 16 controls all hardware specific aspects of the system. For example, if a port in a circuit board of the third information system 22 is to be connected to a port of another board of the third information system, the control processor 16 receives a command from the host processor 34 to make this connection. The control processor 16 translates the information into the appropriate format and communicates with the digital switching matrix, switches and input and output buses 12 via the appropriate input/output port. The control processor 16 also controls the functions of the digital signal processors 48 and determines the master clock source for the system 10 such as for transmitting information on the information system buses 24, 26 and 28 in time division multiplexed PCM format.

The bus 28 of the third information system bus and bus interface circuitry 22 is designed to transfer time division multiplexed PCM encoded information to and from the boards within the hardware illustrated in FIGS. 3-8 and to other peripherals. The interface includes an appropriate master clock which may be 2.048 MHz but the invention is not limited thereto, a transmit data signal, a transmit synchronization signal, a receive data signal and a receive synchronization signal. These signals are provided on the information system bus 28 via a 10-pin ribbon header. A plurality of third information systems each of which is represented by an individual block 22 can be connected to the bus 28 to provide expansion. The clock generation and control including sync circuitry 32 must provide the master clock and synchronization signals to the third information system 22. As explained above a time reference pulse such as a synchronization signal representing the basic frame rate utilized for T1 service may be provided through the PSTN interface 30 as used for T1 service. The interface between the first information system bus 24 and bus interface circuitry 18 is intended in a preferred application to interface with Dialogic Corporation products. In this circumstance it provides a mechanism to transfer information between the digital switching matrix, switches and input and output buses 12 and products which are connected to the information system 18. It should be understood that the first information system 18 is not limited to a particular bus specification with regard to a particular manufacturer such as Dialogic Corporation. The second information system 20 and bus interface circuitry is intended in a preferred application to interface with Natural Microsystems products. It should be understood that the invention is not limited thereto. In a preferred embodiment up to 256 inputs and 256 outputs are coupled to the second information system bus 26. Clock and synchronization signals for the second information system bus 26 may be generated by the second information system bus and interface bus circuitry 20 or alternatively under the control of the clock generation and control including sync circuitry 32 when the host processor 34 is controlling the transfer of information either within the second information system 20 or between the second information system 20 and the first and third information systems 18 and 22. Finally, the clock source provided by the second information system 20 may be used to synchronize the clock generation and control including sync circuitry 32 to slave the master clock signal for at least one of the first and third information systems 18 and 22. In this case, the clock generation and control including sync circuitry 32 acts as a master for the first and third information systems 18 and 22 but is slaved to the second information system 20. Any information system may provide the clock source to the clock generation and control including sync circuitry so that the clock generation and control including sync circuitry acts as a master for the remaining information systems.

The digital signal processors 48 are used to provide tone facilities to the system 10 and to boards within the system that do not have built-in tone functions. The digital signal processors 48 may be an Analog Devices ADSP 2101. A suitable control program for a digital signal processor is contained in the above-referenced microfiche Appendix for the aforementioned Analog Devices integrated circuits at frames 208-240 of the Appendix to application Ser. No. 07/888,161. The digital signal processors 48 are not required to operate the digital switching matrix, switches and input and output buses 12 and provide additional support for other functions of the overall system not involving switching. For example the digital signal processors 48 perform functions such as DTMF generation and detection, call progress generation and detection and MF generation and detection. The digital signal processors 48 are connected to dual-ported RAM 62 via a DSP address and control bus 64 and a DSP data bus 66. Furthermore the dual-ported RAM 62 is coupled to the address bus and control 14 and the data bus 52 of the control processor 16. The dual-ported RAM 62 is configured into a first-in, first-out memory which stores commands from the control processor 16 and information to be transmitted to the processor such as acknowledgement and indicating tones which have been detected.

A plurality of switches which are not illustrated may be used to program functions in the system 10. A switch may be used to provide a 2K offset in the 32K address space of the system 10. A switch sets the input/output base address. Another switch permits the programming of interrupts for determining the interrupt priority in the overall system. A switch may be used to connect an interrupt pull-up resistor with only one switch being installed on one board for a given interrupt. If more than one board shares an interrupt only one board will have this switch. Finally, a switch may be connected to address location A23 of the address bus and control 14 to permit access for memory above 16 megabytes.

Figure 7:
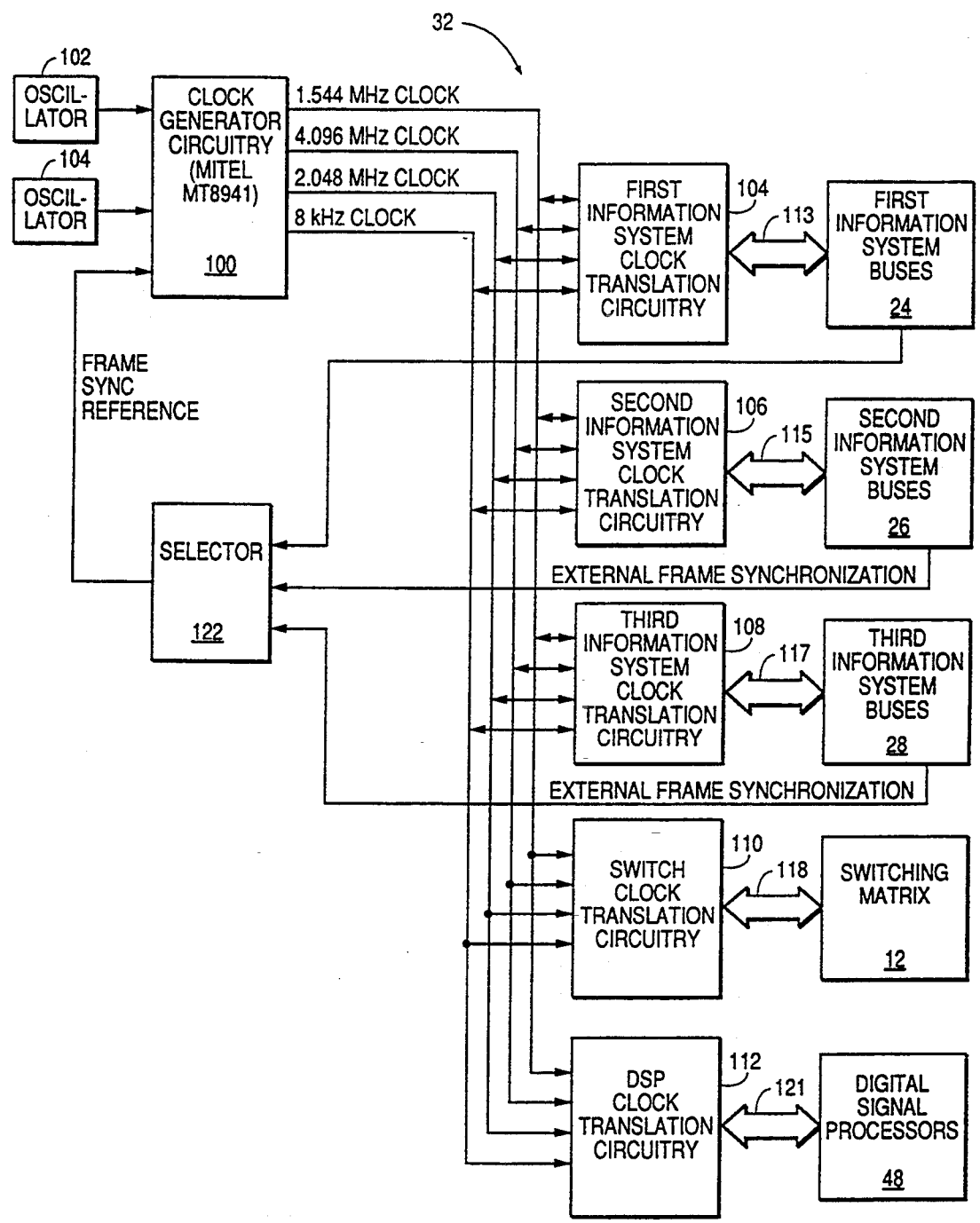
FIG. 7 illustrates a block diagram of the clock generation and control circuitry of FIG. 6.

FIG. 7 illustrates a block diagram of the clock generation and control including sync circuitry 32 of FIG. 6. Like reference numerals identify like parts in FIGS. 6 and 7. Clock generation circuitry 100, which may be a Mitel integrated circuit MT8941, provides output signals comprising clock signals of 1.544 MHz, 2.048 MHz, 4.096 MHz and an 8 kHz synchronization signal in response to an input from a first oscillator 102 having a frequency of 16.384 MHz and a second oscillator 104 having a frequency of 12.352 MHz. The foregoing outputs are connected in parallel to clock translation circuitry for the first information system 104, clock translation circuitry for the second information system 106, clock translation circuitry for the third information system 108, switch clock translation circuitry 110 for the digital switching matrix, switches and input and output buses 12 and DSP clock translation circuitry 112 for the digital signal processors 48. It should be noted that the communication paths between the clock generator circuitry 110 and the first, second and third information system clock translation circuitry 104, 106 and 108 are illustrated as being bidirectional. However, in practice the design of the information systems will determine if communications are only in one direction from the clock generator circuitry 100 or in two directions between the clock generator circuitry and the information system clock translation circuitry. When communications are bidirectional, the information system is functioning as a master clock with the clock generator circuitry being slaved to the master information system and remaining information systems being slaved to the clock generator circuitry. The function of the translation circuitry 104, 106, 108, 110 and 112 is to vary pulse length and to provide time shifting and inversion of the signals generated by generator 100 to provide clock and sync signals having the particular format for driving the buses 24, 26 and 28, the switching matrix, switches and input and output bus 12 and the digital signal processors 48. The clock translation circuitry 104, 106, 108, 110 and 112 is respectively connected to the information system buses 24, 26 and 28 and the switching matrix switches and input and output buses 12 and the digital signal processor 48 with buses 113, 115, 117, 119 and 121. The clock generator circuitry 100 provides common clock and synchronization for permitting the connection of the information system buses 24, 26 and 28 with appropriate clock rates and frame rates as defined by sync pulses to permit the connection of information systems 18-22 having incompatible bus protocols with the protocols of the remaining information systems when they are operated as independent stand-alone systems as defined by their manufacturers. The external frame reference from one or more of the information systems 18, 20 and 22 is coupled from the buses 24, 26 and 28 to a selector 122 which selects a particular external frame synchronization reference from available references which may be from any information system which is connected to the clock generator circuitry 100 to permit slaving to the external source such as with T1 service resulting from a connection to the PSTN or to timing from one of the information systems. As has been stated above, the translation circuitry modifies the clock signal outputs and sync signal from the clock generator 100 to have appropriate pulse length duration and shifting and inversion to be compatible with the particular characteristics of the information system to which the information system buses 24, 26 or 28 is connected while still being overall compatible with all of the other information systems. In other words the translation performed to interface the clock signals and sync signals between the clock generator circuitry 100 and the individual information systems 18, 20 and 22 does not alter the standard timing output by the clock generator circuitry to a point where the operation of the individual buses is incompatible when they are connected between information systems 18, 20 and 22 by the digital switching matrix, switches and input and output bus 12.

Figure 1:
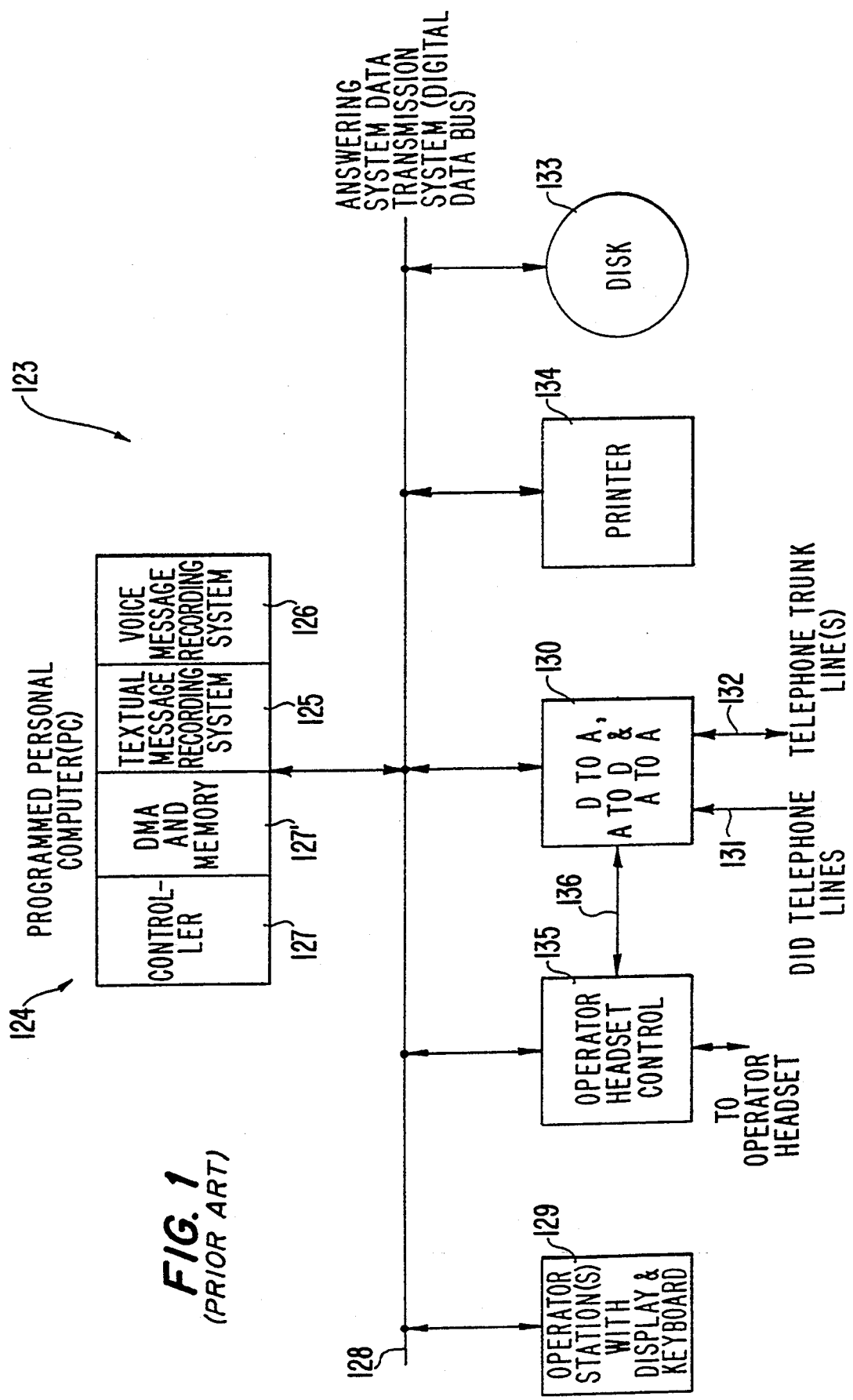
FIG. 1 illustrates a block diagram of a prior art telephone answering system of the Assignee.
Figure 2:
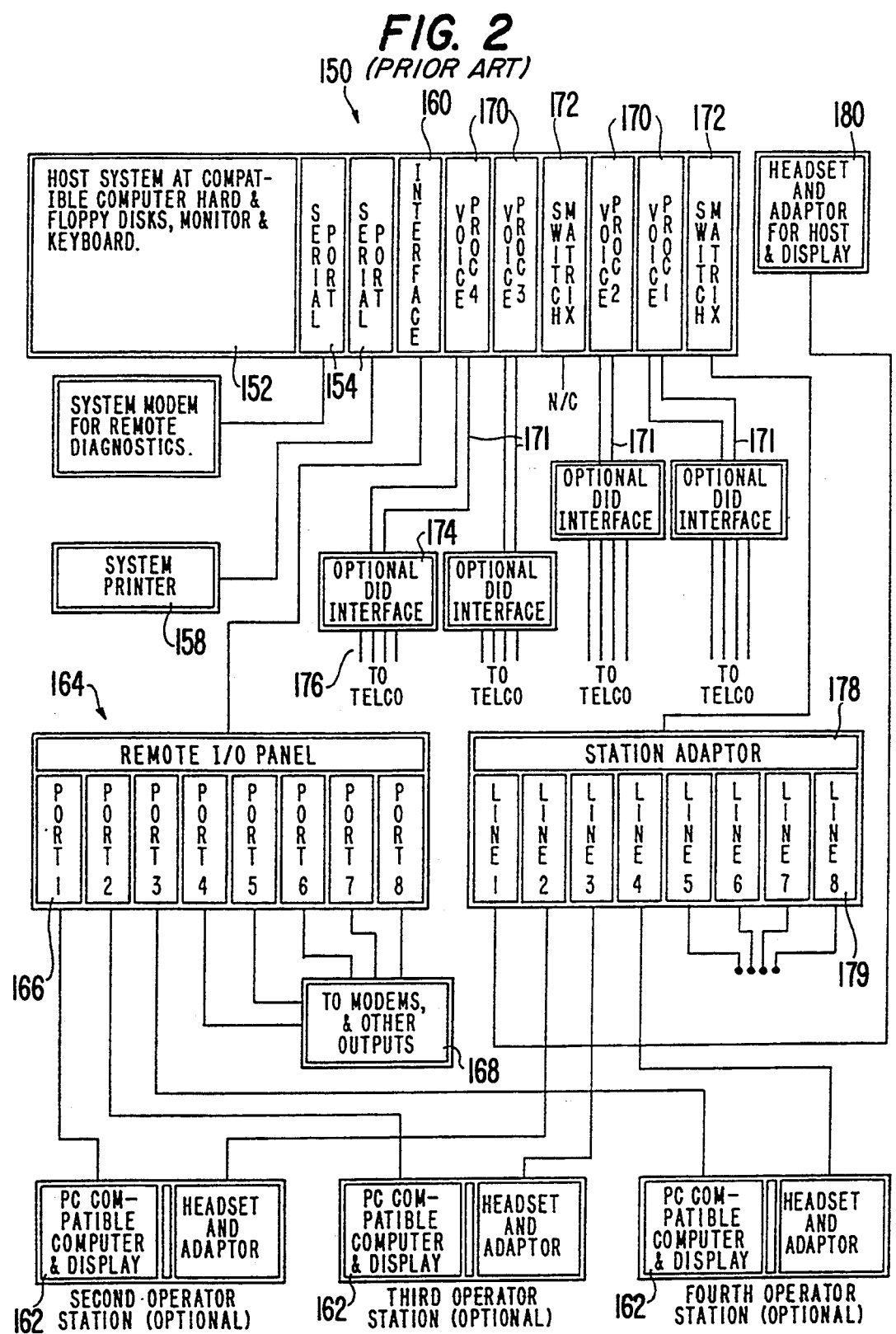
FIG. 2 illustrates a detailed block diagram of the prior art answering system of the Assignee.
Figure 3:
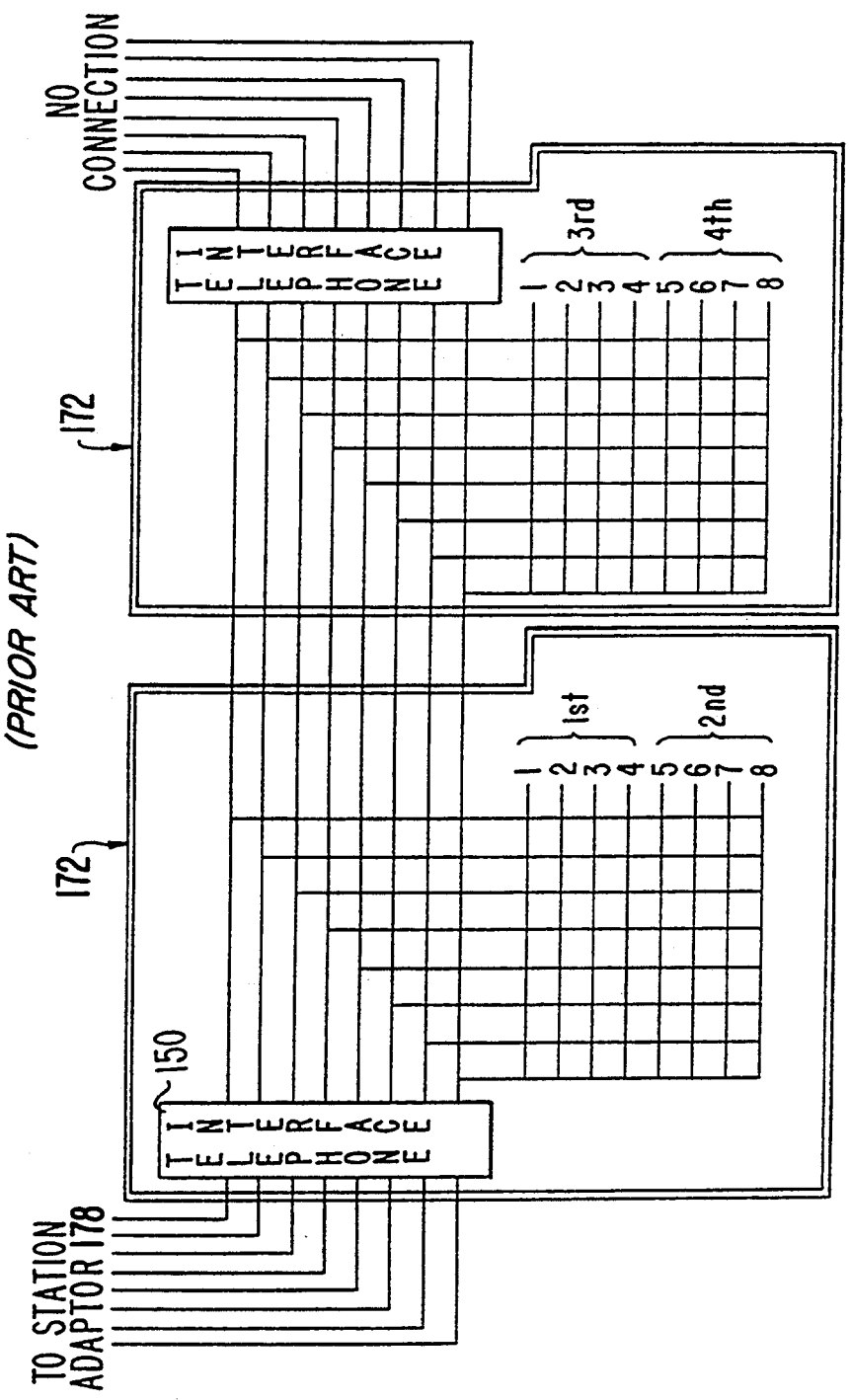
FIG. 3 illustrates a block diagram of the switching matrix of the prior art telephone answering system of the Assignee.
Figures 4, 5:
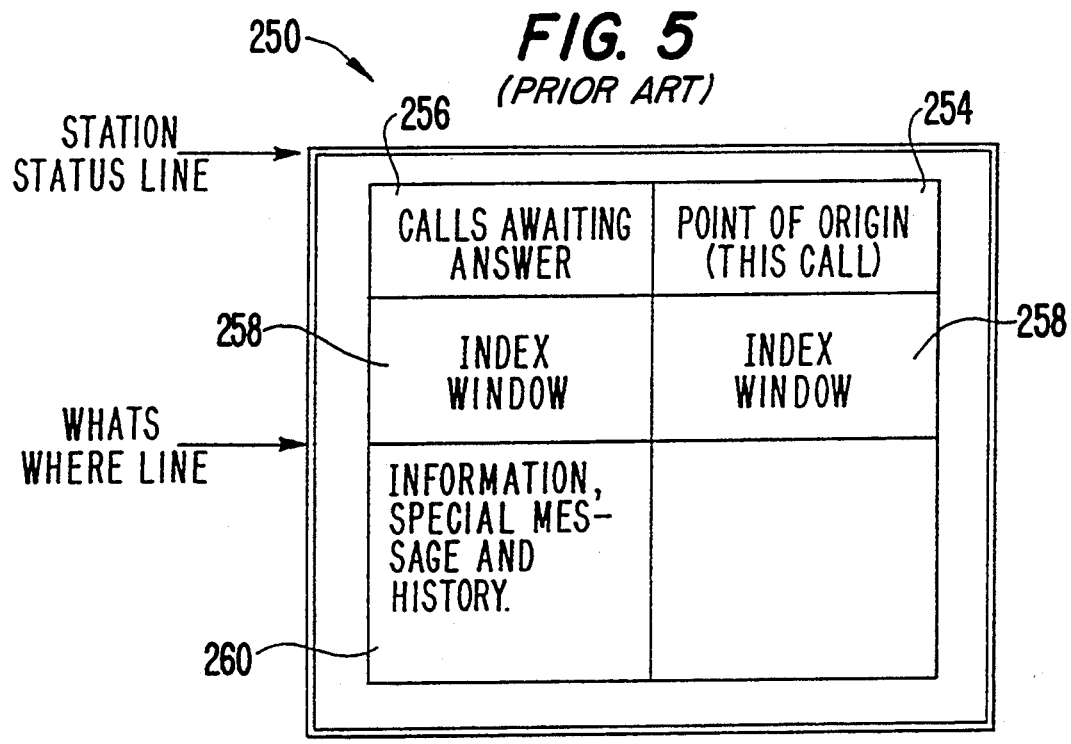
FIG. 4 illustrates an individual subscriber file used with the prior art telephone answering system of the Assignee.
FIG. 5 illustrates a block diagram of the display used by an operator station of the prior art telephone answering system of the Assignee.
Figure 8A:
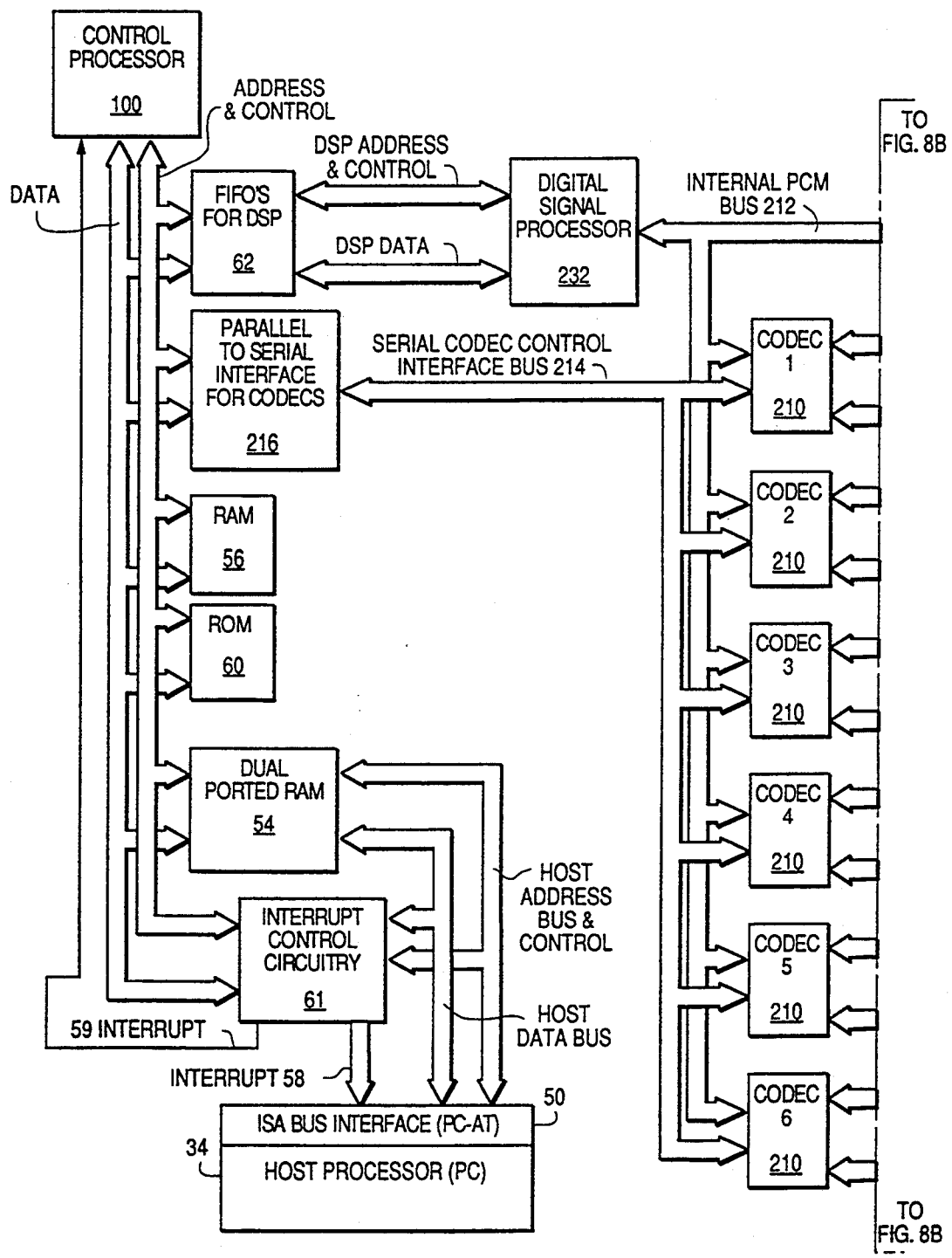
FIG. 8 illustrates a block diagram of a line interface which may be utilized in the third information system of FIG. 6.
Figure 8B:
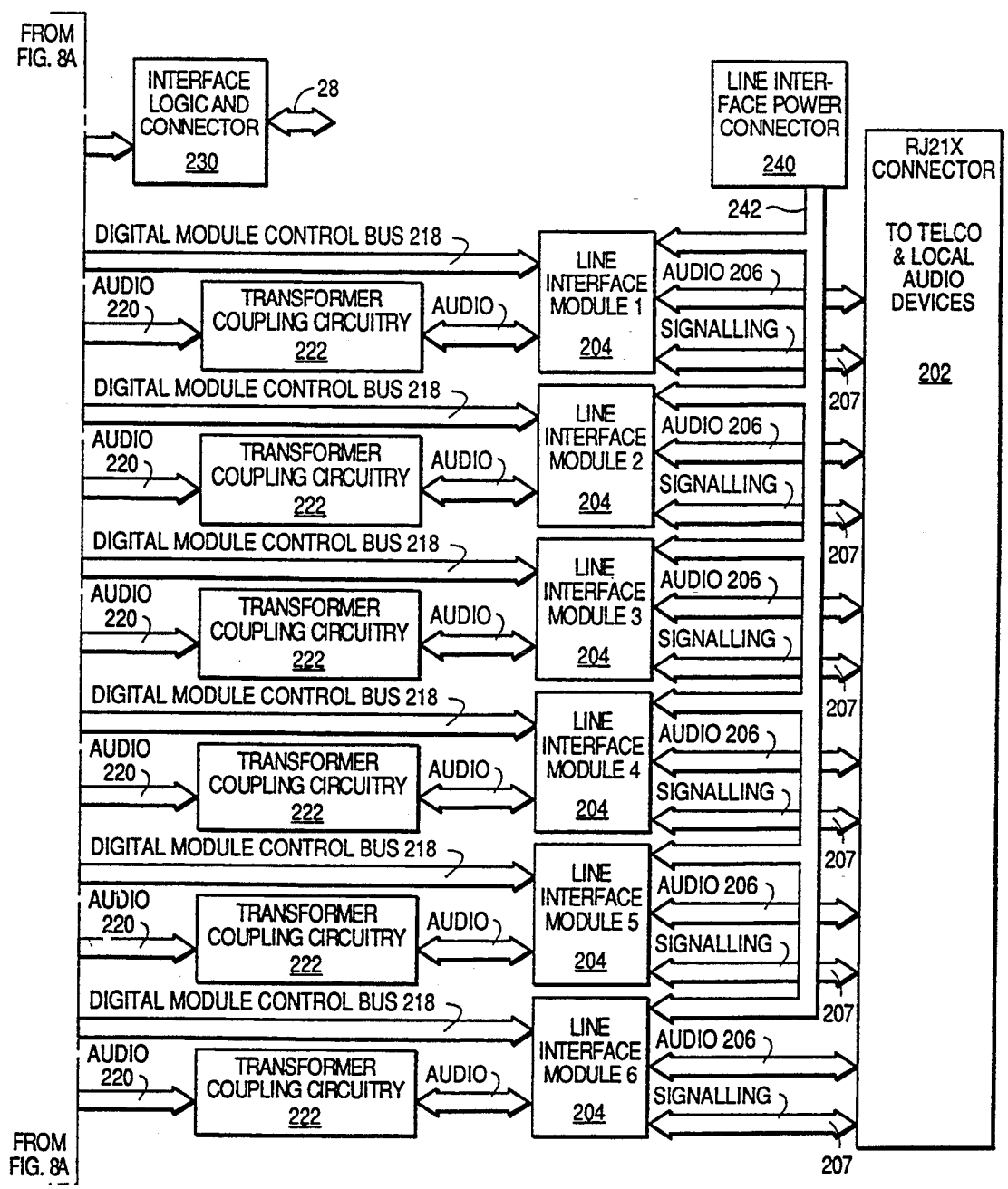

FIG. 8 illustrates a block diagram of an implementation of a third information system 22. Like reference numerals identify like parts in FIGS. 6-8. It should be understood that a preferred embodiment of the third information system 22 may be configured into seven groups of five interconnected circuit boards each having the circuitry of FIG. 8. However, the third information system 22 is not limited thereto. The individual groups of five circuit boards in accordance with FIG. 8 may be interconnected with a 10-pin ribbon cable to the individual interfaces contained within the block represented by the third information system bus and bus interface circuitry 22 of FIG. 6. As a result, the groups of five circuit boards having the circuitry of FIG. 8 may be connected into a complete third information system 22 which may be further connected with other information systems 18 and 20 as illustrated in FIG. 6 to provide multiple conferencing capabilities making the system of FIG. 1 extremely flexible for current or future voice and data applications and expansion as a result of permitting the connection of otherwise incompatible systems. It should be noted that many of the parts of FIGS. 6 and 8 are common and perform substantial the same function. When a part is not described in detail its function should be understood to be similar to that described above with regard to FIG. 6.

The third information system 22 functions as a general purpose line interface for up to six analog telephone lines which can be any combination of DID, E&M, source, ground start, loop start or battery feed as described above. These connections are indicated by the RJ21X connector to telco and local audio devices 202. Individual line interface modules 204, which are discussed below in conjunction with FIGS. 9–13, are plugged into the ports in the circuit board represented by FIG. 8 to configure a particular audio line 206 as determined by the characteristic of the line interface modules 204 described below to interface with the type of analog line service provided by the line interface module.

As a consequence of splitting the circuitry between the line interface modules 204, which are removable from the ports of the third information system, the quantity and type of circuitry required to be present within the individual board implementing the third information system 22 is reduced thereby reducing the cost of the board and further providing space for additional line ports. For example, the present invention, as illustrated in FIG. 8, provides a 50% increase in the number of ports which are available over a prior art circuit as described above which had all of the circuitry for interfacing the five different types of analog line interfaces of the present invention resident on the circuit board. The address space of the control processor 34 and host processor 100 as implemented in the dual-ported RAM 54, RAM 56, ROM 60 and dual-ported RAM 62 is similar to that discussed above with regard to FIG. 6 both with regard to input, output and memory space on the PC bus. The memory space of the third information system 22 may be in common with the system of FIG. 6 in which the third information system is configured.

The control processor 100 is preferably a Hitachi 64180 microcontroller like the control processor of FIG. 6. The system provides access to 32K of ROM, 30K of RAM and 2K of dual-ported RAM as respectively implemented in ROM 60, RAM 56 and dual-ported RAM 54. The ROM 60 provides program storage for the intended application of the third information system 22. The RAM 56 is used for variable storage of temporary information. The dualported RAM 54 provides the interface between the control processor 100 and the host processor PC 34.

The control processor 100 controls all hardware specific aspects of the system. For example, if a port to which one of the line interface modules 204 is connected is set up as a DID port, the control processor 100 may receive a command from the host processor 34 to establish a connection in the DID port. The control processor 100 translates this information into an appropriate format and communicates with the DID port via one of the CODECs 210. Each CODEC 210 is connected to the internal PCM bus 212 and to the serial CODEC control interface bus 214. The serial CODEC control interface bus 214 is connected to a parallel to serial interface for CODECs 216 which provide communications with the control processor 100. The CODECs 210 are also connected to the line interface modules 204 through the combination of digital module control bus 218 and audio signal path 220 which includes transformer coupling circuitry 222. The transformer coupling circuitry 222 provides high voltage protection to the electronics of the third information system 22 and DC isolation.

The CODECs 210 utilize a serial communications interface through the serial CODEC control interface bus 214. The parallel to serial converter 216 permits the control processor 100 to address the CODECs. The CODECs provide numerous functions utilized in a telephony environment for establishing telephony connections. The CODECs 210 provide digital control outputs and sensor inputs. The outputs are used to control relays and other circuitry (not illustrated) necessary to seize and release telephone lines, inject ringing, etc. The inputs provide information regarding presence of loop current and presence of ring voltage, etc. The particular function of each signal is dependent upon the telephone type (DID, LOOP, START, etc.). The CODECs 210 also control the audio path 220 and perform A/D and D/A conversion of the audio signal. The analog side is transferred via transformer coupling 222 to the line interface module 204 to the telephone company or telephone instruments. The digital side through internal PCM bus 212 is transferred to interface logic and connector 230 which is connected to the third information system bus 28. The third information system bus 28 permits connection to other boards containing other third information systems 28 or to different line interface modules 204 through the internal PCM bus 212. The internal PCM bus 212 uses time division multiplex PCM encoding (either A-LAW or U-LAW). For example, the system may contain 32 devices which each transmit information on a single pair of wires. Each device communicates on one or more channels with the CODECs 210 controlling the time slots of a particular channel on which a conversation or other audio or data information may be transmitted.

The digital signal processor 232 provides tone resources required when connecting to telephone lines. These resources include DTMF generation, DTMF detection and call progress generation. Additionally, limited three-way conferencing is included in the capability of the digital signal processor 232. The call progress tones include all standard precise call progress tones required in the United States. The digital signal processor 232 sends tones directly over the internal PCM bus 212 to the CODECs 230 present in the third information system contained in FIG. 8. The digital signal processor 232 also receives tones from either the CODECs 230 or from the bus 28 through the interface logic and connector 230. Call progress tones are output continuously with no intervention from the control processor 100. Other functions are controlled by the control processor 100 via the FIFOs 62 for the digital signal processor 232 which in a preferred application are present as two 512 byte FIFOs. A standard command set is used to implement all of the functions performed by the digital signal processor 232. The digital signal processor 232 is used in some applications to provide PCM clock to the CODECs 230 present within the third information system 22 and to the bus 28. The clock source is controlled by suitable switches (not illustrated) which are within the third information system of FIG. 8. The state of one of the switches is read by the control processor 100 which then sends an appropriate command to the digital signal processor 232 to either provide the master clock, or slaved to an external clock.

The third information system bus 28 is a time division multiplexed bus which is designed to transfer PCM encoded information to and from the individual third information systems 22 as illustrated in FIG. 8 and to other third information systems and to the overall system of FIG. 6 as described above. The interface logic and connector 230 includes an appropriate master clock (usually 2.048 MHz but this is not a requirement), a transmit data signal, a transmit data synchronizing signal, a data receive signal and a receive synchronization signal. These signals are available for use by other third information systems 22 as well as the system of FIG. 6 via a 10-pin ribbon header. Expansion of the system beyond six modules 204 may be made through connections through the third information system bus 28. When a plurality of the third information systems 28 are connected together into a single system it is necessary that one of the third information systems such as that illustrated in FIG. 8 provides master clock and synchronization signals to the third information system bus 28 interconnecting the other third information systems assuming that operation independent of the system of FIG. 6 is occurring. A switch may be selected to program which of the third information systems 22 is to be the master. As a result all other third information systems 22 will be slaved to the master clock provided from the third information systems which has the program switch.

The RJ 21X connector to the telco and local audio devices 202 interfaces to telephone lines and peripherals. The connector 202 interfaces internally to the five types of line interface modules 204 as described below in conjunction with FIGS. 9–13 to provide interfaces with selectable types of audio lines as described above (DID, loop, start, etc.). The modules 204 transmit audio and signalling information to the CODECs 210.

A plurality of different types of modules are provided for different kinds of telephone lines and peripherals. The modules 204 are designed to affect the audio path as little as possible. The currently designed modules as described below are DID interface, a loop start interface, ground start interface, E&M interface, and source interface. The DID interface provides 48 volt battery to the telephone company as well as battery reversal provisions and current sensing for off hook detection. The loop start interface provides battery sink in the off hook state. Ring detection is available when on hook and current detection is available when off hook. This interface functions like a standard telephone set. The ground start interface provides all functions that the loop start interface provides with ground detection and seizure capabilities required by ground start lines. The E&M interface supports E&M types I and II. The audio path is untouched. The source interface provides battery to a standard telephone. If a ring generator is available, it can also ring the telephone to alert the user of an incoming call. Battery is applied at all times and current detection is always available.

The use of modules gives significant flexibility to the overall usage of the third information system 22. Since each module 204 supports only one or two line types, it is unnecessary to include circuitry for all types of analog line interfaces on a given module. Moreover, if special purpose functions are required, a new module can be designed to provide these functions. As a result it is not necessary that the individual third information systems 22 contain all of the circuitry necessary to support all of the analog line functions provided by the different types of line interface modules 204. Moreover, since telephone lines are occasionally exposed to hazardous voltages the use of the modules 204 makes repairs more straightforward such as if a component on a module is damaged the module can be easily replaced. Additionally, if this component were soldered into the main third information system 22 the repair would be much more difficult and time consuming. The third information system 22 includes a line interface connector 240 which permits a 48 volt power supply and ring generator to be connected to the board. The power supply and ring voltages are bussed to the line interface modules 204 by bus 242.

Multiple line interfaces are provided to the third information system 22 by the plug-in modules 204 for each of six ports. The modules 204 are attached to the main board containing the remaining circuitry of the third information system 22 of FIG. 8 with two 16-pin connectors. The signal names and pinouts for these connectors are as follows: Px00:

Pin 1: −48V. Provides −48V to module.
Pin 3: −48V. Same as pin 1.
Pin 5: −48V. Same as pin 1.
Pin 7: NC
Pin 9: NC
Pin 11: TELGND. Provides telephone ground to module.
Pin 13: TELGND. Same as pin 11.
Pin 15: TELGND. Same as pin 11.
Pin 2: TIP IN. Tip input from Telco.
Pin 4: RING IN. Ring input from Telco.
Pin 6: E. E-lead input from Telco.
Pin 8: SG. Signal Ground input from Telco.
Pin 10: M. M-lead input from Telco.
Pin 12: SB. Signal Battery input from Telco.
Pin 14: RINGBUS. Provides Ringing Voltage to module.
Pin 16: RINGBUS. Same as pin 14.
Px01:
Pin 1: TIP OUT. Tip output to CODEC.
Pin 3: RING OUT. Ring output to CODEC.
Pin 5: RELAY 0. Line Seizure Relay Drive. Active Low.
Pin 7: RELAY 1. Secondary Relay Drive. Active Low. For M, Ground Start, etc.
Pin 9: RELAY 2. Third Relay Drive, Active Low. For miscellaneous functions (such as ring insertion).
Pin 11: SENS 2. Third sense CODEC input. Active Low. E-Lead and Ground Start.
Pin 13: SENS 1. Second sense CODEC input. Active Low. Senses Ring Voltage on Sink module. Reflects current state of ring generator on source module.
Pin 15: SENS 0. First sense CODEC input. Active Low. Primary current sensor for all modules.
Pin 2: 0V. Ground input from main board for logic signals.
Pin 4: 0V. Same as pin 2.
Pin 6: 0V. Same as pin 2.
Pin 8: +5V. +5V input from main board for logic signals.
Pin 10: +5V. Same as pin 8.
Pin 12: +5V. Same as pin 8.
Pin 14: MODRST. Active low reset signal to modules.
Pin 16: PULLUP. Provides a 10K pullup resistor for general purpose use on module.

Figure 9:
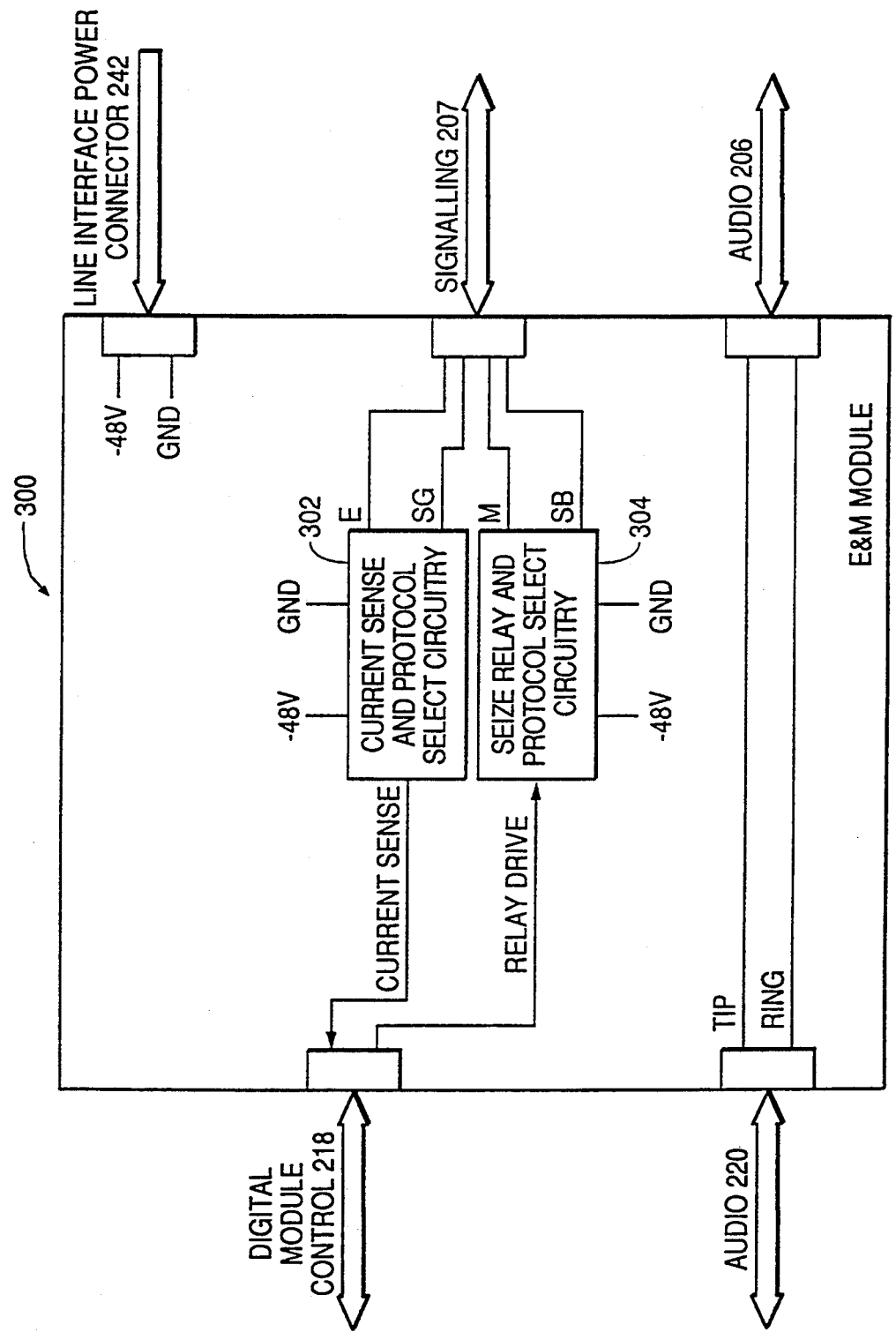
FIG. 9 illustrates a block diagram of an E&M module for use in the line interface of FIG. 8.

FIG. 9 illustrates a block diagram of a suitable E&M module 300 for use as a line interface module 204 in FIG. 8. Like reference numerals identify like parts in FIGS. 6–13. The current sense and protocol select circuitry 302 contains jumper switches that are used to partially select the desired E&M protocol such as E&M Types I and II. The current sense and protocol select circuitry 302 in conjunction with jumper switches detects the presence of current in E and SG leads. The seize relay and protocol select circuitry 304 contains jumper switches that are also used to partially select the desired E&M protocol such as E&M Types I and II. The seize relay and protocol select circuitry 302 in conjunction with the jumper switches controls the flow of current in M and SG leads.

Figure 10:
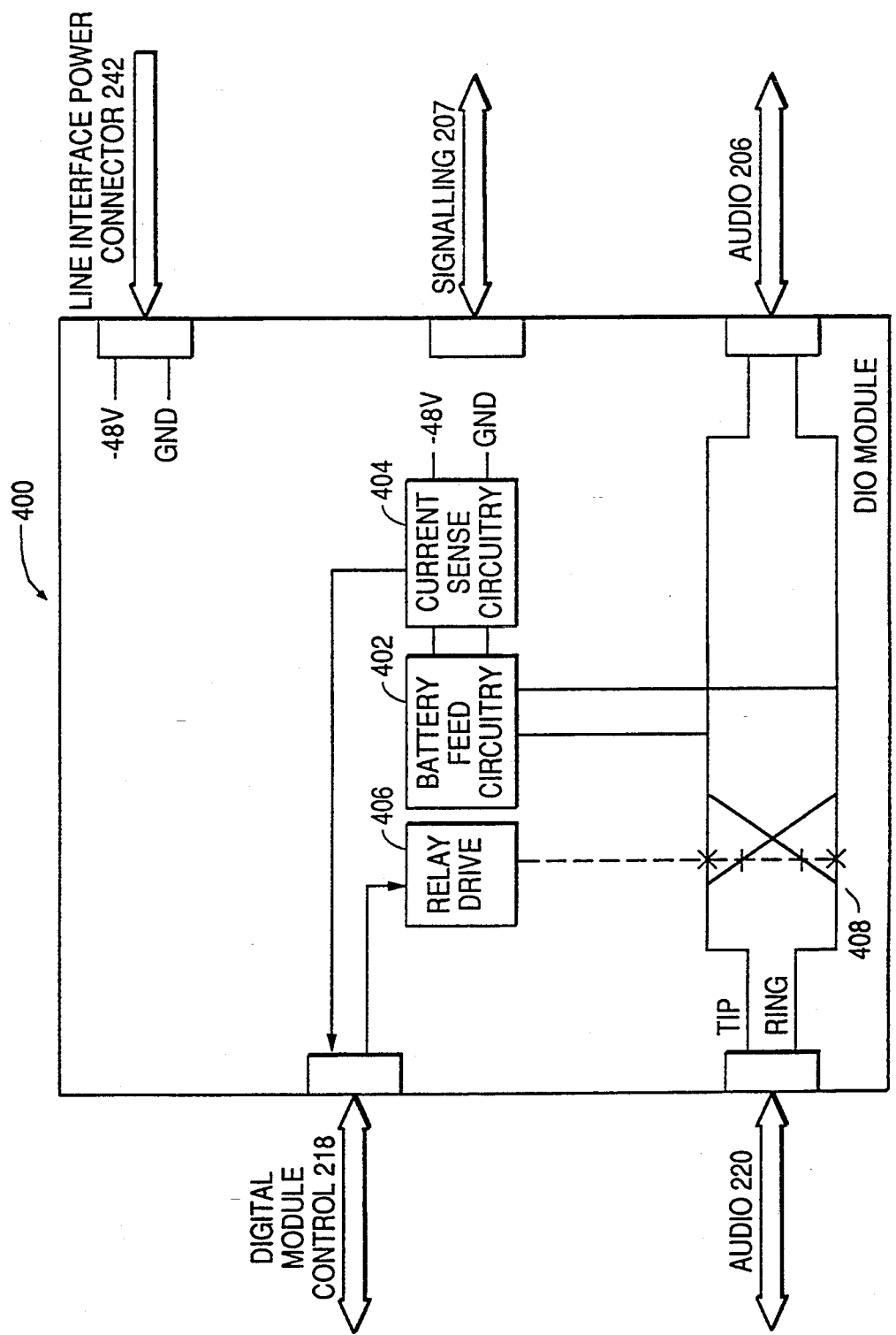
FIG. 10 illustrates a block diagram of a DID module for use in the line interface of FIG. 8.

FIG. 10 illustrates a block diagram of a suitable DID module 400 for use as a line interface module 204 in FIG. 8. The battery feed circuitry 402 provides DC current to the audio interface 220 but acts as a high impedance to AC signals that represent audio information. The current sense circuitry 404 detects the presence of current flowing from the line interface power connector 242 through the battery feed circuitry 402 and the audio interface 220 to indicate line seizure and release by external devices. The relay drive 406 is used to activate and deactivate relay 408 that controls the polarity of the voltage and current that is supplied to the audio interface 220.

Figure 11:
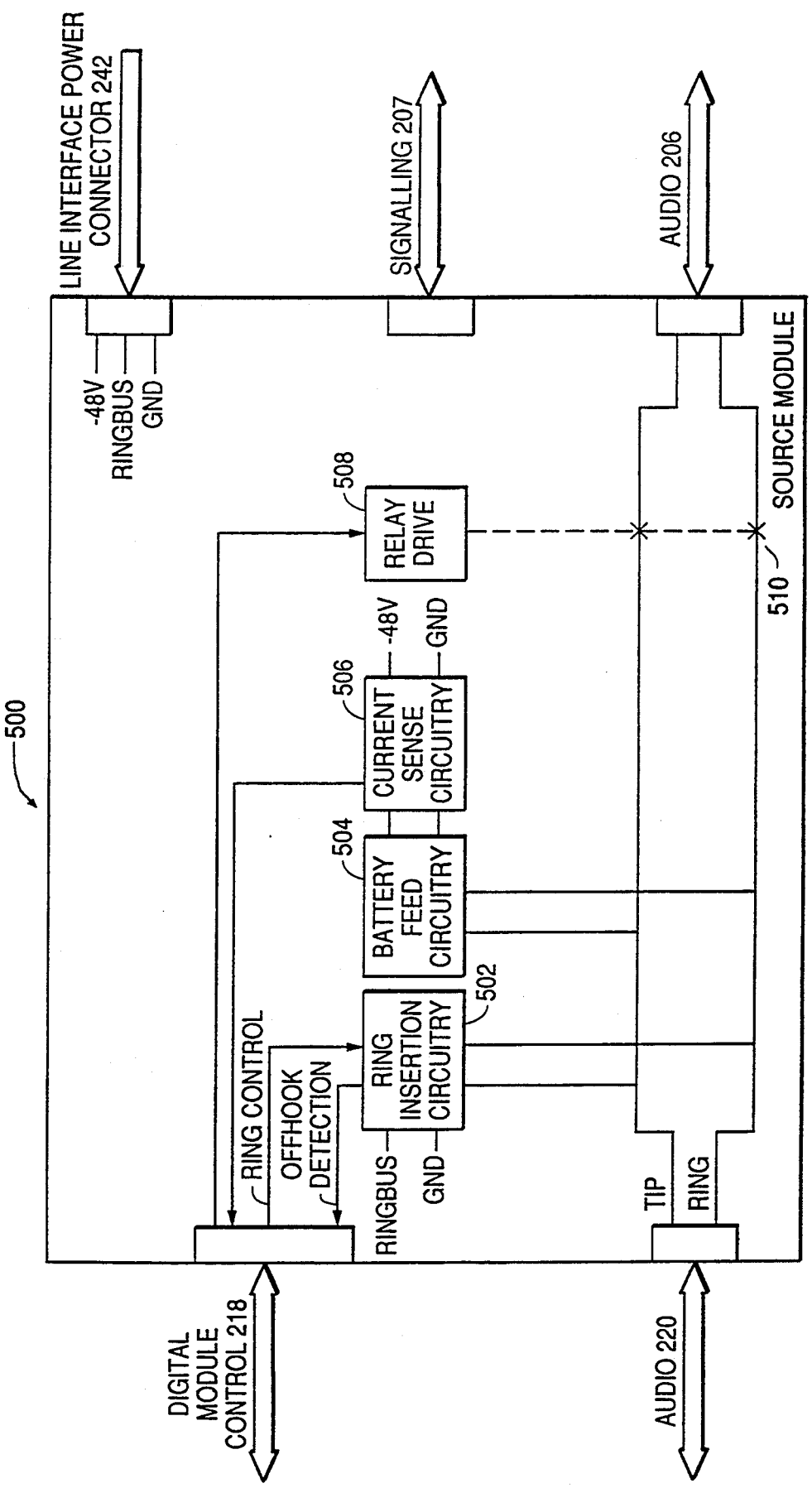
FIG. 11 illustrates a block diagram of a source module for use in a line interface of FIG. 8.

FIG. 11 illustrates a source module 500 for use as a line interface module 204 in FIG. 8. The ring insertion circuitry 502 includes relay controls that activate and deactivate the application of ring voltage to the audio interface 220. The ring insertion circuitry 502 also monitors the audio interface 220 for DC current and removes ring voltage when DC current is present. The ring insertion circuitry 502 provides an indication to the digital module control 218 of the current state of the ring insertion circuitry. The battery feed circuitry 504 and current sense circuitry 506 are similar to circuits 402 and 404 described in conjunction with FIG. 10 above. The relay drive 508 controls relay 510 to control connection of the audio 220 to the audio 206 by closing relay 206 so that audio information can be transmitted through the module 500.

Figure 12:
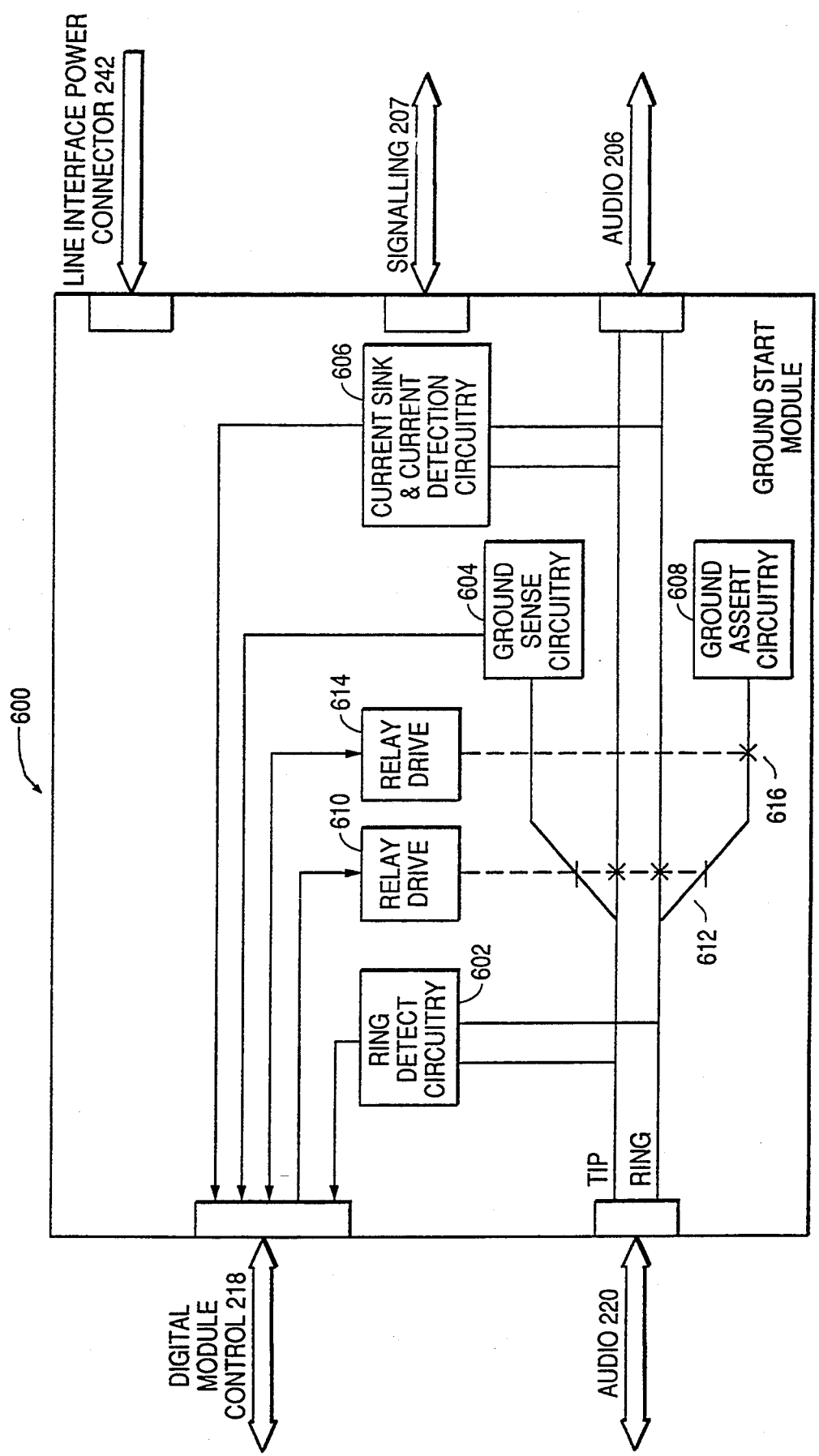
FIG. 12 illustrates a ground start module for use in the line interface of FIG. 8.

FIG. 12 illustrates a ground start module 600 for use as a line interface module 204 in FIG. 8. The ring detect circuitry 602 provides a signal to digital module control 218 that indicates the presence of ring voltage on the audio interface 220. The ground sense circuitry 604 provides a signal to digital module control 218 that indicates when the TIP lead connected to the audio interface 220 is connected to ground. The current sink and current detection circuitry 606 provides a DC current path to the audio interface 220 when a connection is established. The ground assert circuitry 608 connects the RING lead connected to the audio interface 220 to ground through a current limiting network. A signal is provided to the digital module control 218 to indicate the presence of DC current. Relay drive 610 controls relay 612 to control connection of audio 220 to audio 206 through the module 600 by closing relay 612. The ground sense circuitry 604 is normally connected to the TIP line by the relay 612 which also closes the other contact to permit connection of the ground assert circuitry 608 depending upon the state of relay 616 as described below. Relay drive 614 controls closing of relay 616 to control connection of the ground assert circuitry 608 to the RING line when relay 612 is in its normal state in which audio 220 is not connected to audio 206 through the relay 612.

Figure 13:
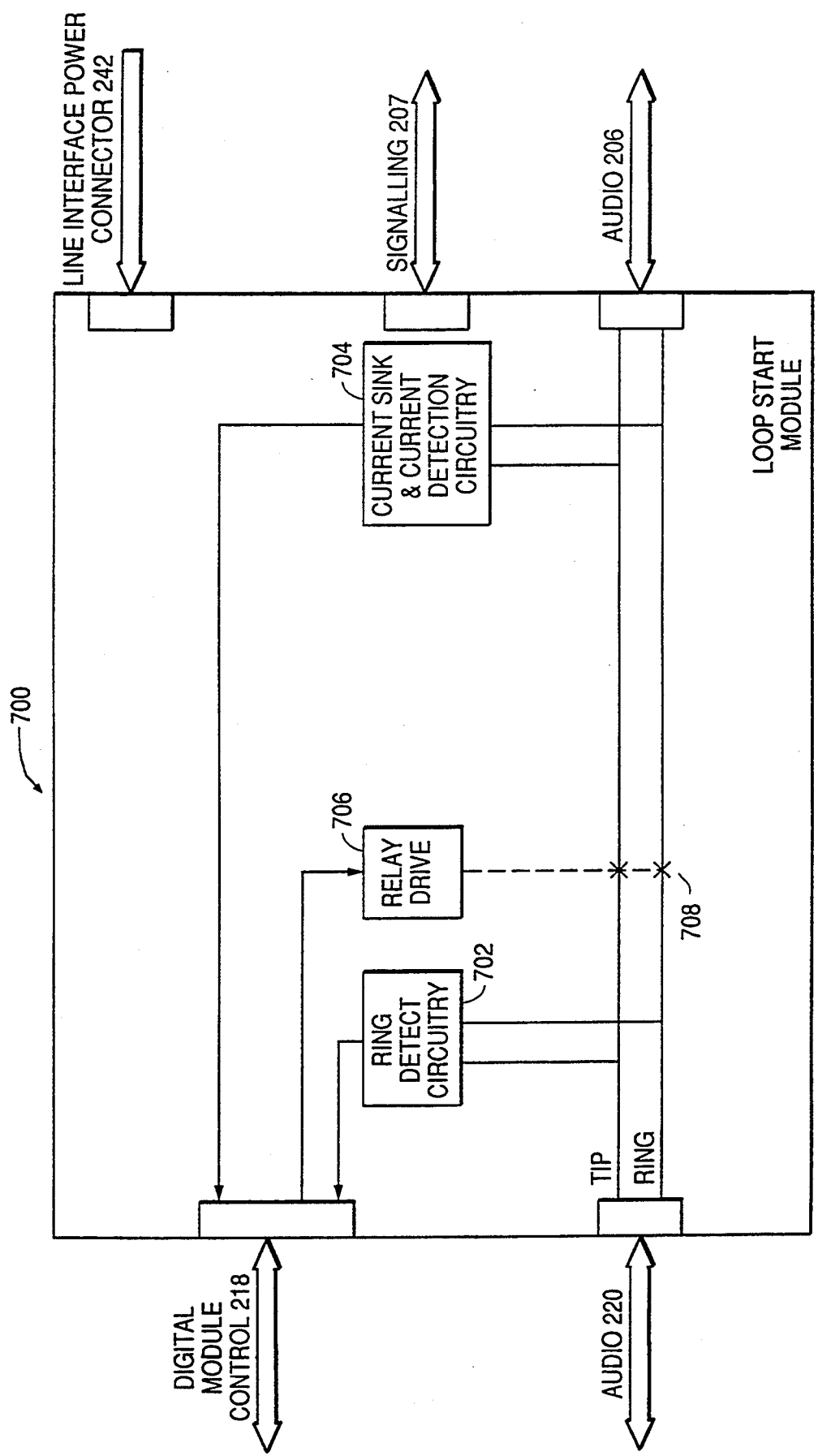
FIG. 13 illustrates a block diagram of a loop start module for use in the line interface of FIG. 8.

FIG. 13 illustrates a loop start module 700 for use as a line interface module 204 in FIG. 8. The ring detect circuitry 702 and current sink and current detection circuitry are identical to circuits 602 and 606 in FIG. 12. The relay drive 706 controls relay 708 which is normally open to connect the audio 220 to the audio 206.

In a preferred application of the present invention, the host processor 34 of FIGS. 6 and 8 is also used to control and implement a telephone answering system with integrated voice and textual message storage containing the functional capability as described above in conjunction with the Assignee's U.S. Pat. Nos. 4,916,726 and 5,113,429 and PCMX ® telephone answering system. Each of the functions described above in conjunction with FIGS. 1-5 are implemented by the host processor 34 of FIGS. 6 and 8 in addition to the functions of the host processor as described above with reference to FIGS. 6 and 8 in connecting information systems together with incompatible bus protocols. The integration of voice and textual message storage under common control by the host processor 34 having the functional capability of the Assignee's patents and PCMX ® answering system provides connecting together diverse information systems with incompatible bus protocols into a single system into a telephone answering system. The controller is preferably a PC and may be controlled by a control program as set forth in the microfiche Appendix hereto at frames 241-490. The ability to connect information systems with incompatible bus protocols permits an integrated telephone answering system to be made having integrated voice and textual message storage and reproduction from different manufacturers of voice and data processing products and permits an existing telephone answering system to be retrofit or configured to voice processing and data processing products manufactured by different manufacturers which do not have standard bus protocols. The prior art does not provide the capability of connecting information sources which provide digitized voice or data for connection through a switching matrix to other information sources within an integrated telephone answering system providing voice and textual message storage and reproduction capability.

Figure 14:
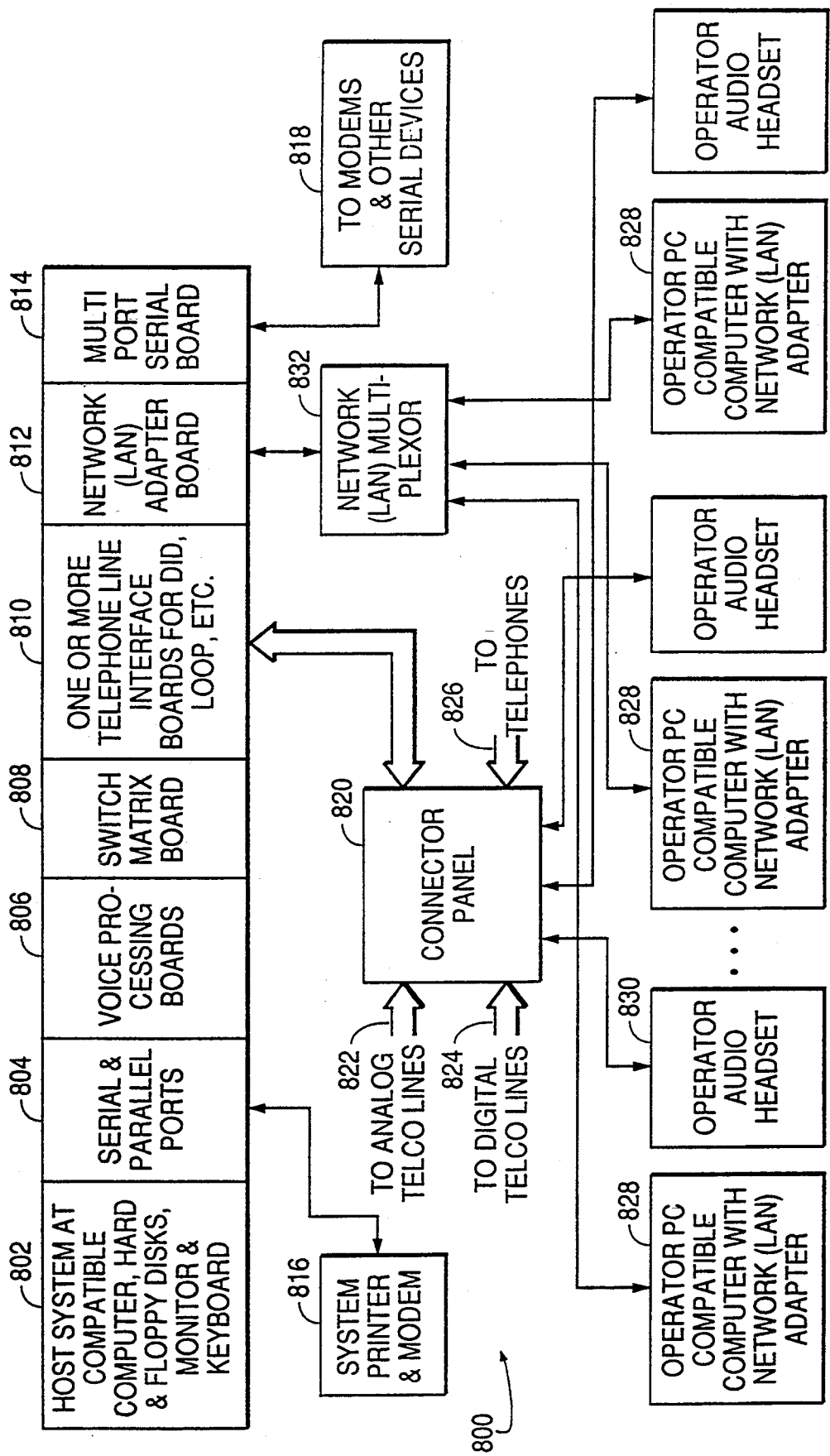
FIG. 14 illustrates a block diagram of a commonly controlled PABX and telephone answering system including voice message recording and textual message recording in accordance with the present invention.

FIG. 14 illustrates a block diagram of a PABX connected to a plurality of telephones within the exchange for controlling telephony functions between the telephones within the exchange and telephony functions of the telephones within the exchange to and from the exchange which is integrated with a telephone answering system under common control for providing textual messages and voice messages produced by the telephone answering system answering telephone calls to telephones within the exchange. The PABX and answering system common control is implemented by a controller which is preferably a host computer controlled by a single control program which calls and executes modules described below.

The PABX and telephone answering system 800 differs from the prior art as described above in conjunction with FIGS. 1-5 as follows. The system 800 provides a common controller for controlling a textual message recording system, a voice message recording system, PABX operation including telephony functions, LAN functions and communications between operator stations. The prior art described above does not integrate a telephone answering system with textual message and voice message recording capability with the control of a PABX. Additionally, the prior art, as described above, does not disclose a single control program for controlling textual message recording system, voice message recording system, PABX, LAN and operator communication modules. Additionally, the prior art, as described above, in FIGS. 1-5 utilizes serial communications between the host system and operator stations instead of a LAN for providing control communications between the host and the operator stations in accordance with the present invention.

The host system AT compatible computer, hard and floppy disks, monitor and keyboard 802 decodes telephone calls to telephones within the PABX to be answered by an operator to identify a characteristic stored in the disks of the PABX and the telephone answering system, causes the identified characteristic to be displayed by operator stations at which the operator answers the telephone call to provide the operator answering the telephone call with the characteristic for use in answering the telephone call at the operator station, controls the recording of messages by the telephone answering system, controls reproduction of the recorded messages to provide caller access to messages recorded by the voice message recording system and access through an operator to messages recorded by the textual message recording system and controls operation of the exchange to control the telephony functions between telephones within the exchange and the telephony functions of telephones within the exchange to and from the exchange. The characteristics may be any of those described above with reference to the Assignee's patents or supported by the program appearing at frames 241-490 of the Appendix hereto. The program at frames 241-490 may be used to control the host system to provide a telephone answering system providing textual and voice recording under common control having the functional capability as described above with reference to the Assignee's patents.

The telephony functions may be any functions utilized with PBXs or PABXs. For example, the telephony functions may include providing multiple PSTN connections, such as loop start, ground start, DID, and T-1 which provide a mechanism for connecting extensions on the PABX to the outside world; providing multiple extensions which are available on tone generating or rotary dial telephones with each telephone having at least one extension in the PABX; providing two party connections which connect two parties within the PABX together in a full duplex conversation in which one of the parties originates a call by picking up a telephone in the exchange and dials a number and the PABX interprets the number and alerts the other party with the connection being established when the other party goes off hook; providing two party connections which connect one party within the PABX and another party connected to the PSTN together in a full duplex conversation in which the party within the PABX originates a call by picking up a telephone receiver, dialing an access code, such as "9" or "#" and then an existing number but restrictions may be placed on what telephone numbers may be allowed such as restricting access to "900" numbers; permitting an external party to connect to a telephone within the exchange by dialing the telephone number of one of the PSTN trunks connected to the PABX which, depending upon the type of trunk, either results in the direct connection to the internal party or connection to an operator; providing multiple-party conferencing which allows more than two parties to carry on a conversation; providing transfer in which a party involved in a conversation can transfer the call to another party which is accomplished by momentarily depressing the hook switch, dialing the other party, hanging up after the party has answered or ring back is heard, etc.; supporting of an operator console, in which one or more internal ports are routed to the operator console, with the consoles typically having more control functions than a telephone within the exchange; generating call progress tones in which parties connected to the PABX are given appropriate call progress tones depending upon status of the call which they are making including ring back, busy tone, reorder (fast busy) and dial tone with other special tones also being available; and generating alerting tones in which the PABX alerts a party by ringing a telephone and with other alert signals being included such as a message waiting indication. The implementation of each of the foregoing telephony functions is well known and will not be described in detail with it being understood that these functions are controlled by the system control and PABX modules described below in conjunction with FIG. 15. The host system has the capability to support each of the functions described above with respect to the prior art of FIGS. 1-5 and the embodiments of the invention described above in conjunction with FIGS. 6-14. These functions are not described herein again.

The host system AT compatible computer, hard and floppy disks, monitor and keyboard 802 is connected to serial and parallel ports 804, voice processing boards 806, a switch matrix board 808 which may include the digital switching matrix and control described above in conjunction with FIGS. 6-14, one or more telephone line interfaced boards for DID, Loop, etc. 810, a network (LAN) adapter board 812 which is described in more detail below in conjunction with FIG. 16 and a multiport serial board 814. The system printer and MODEM 816 are connected to the serial and parallel ports 804 to provide hard copy output of system information and external access to the host system. The multiport serial board 814 is connected to modems and other serial devices which may be varied in accordance with the application of the invention. The one or more telephone line interface boards 810 are connected to a connector panel 820 which provides access to analog telco lines 822, digital telco lines 824 and telephones 826 within the exchange. It should be understood that alternatively the switch matrix board may be any type of well-known digital switching matrix which is used in PABX applications. It should be noted that the host system AT compatible computer contains a system control and text messaging modules and voice messaging modules as described below in conjunction with FIG. 15 which function as the control for a voice message recording system for recording voice messages provided by telephone calls to telephones within the exchange answered by the telephone answering system and a textual message recording system for recording textual messages provided by an operator at one or more operator stations 828 which include an operator PC compatible computer, display for displaying any of the aforementioned characteristics used for answering telephones 826 within the exchange discussed above with reference to FIGS. 1-5 and network (LAN) adapter. The operator stations 826 may be in accordance with those described above in the Assignee's prior art system of FIGS. 1-5 or other known operator stations. Frames 491-641 of the microfiche Appendix hereto are a program for controlling an operator station of the type used in the Assignee's PCMX ® telephone answering system. The connector panel 820 is also connected to an operator audio headset 830 which is used by the operator in answering telephone calls in accordance with the description as set forth above.

A LAN connects the host AT compatible computer, hard and floppy disks, monitor and keyboard 802 through the network adapter board 812 and multiplexor 832 to the plurality of operator stations 828. The network multiplexor 832 multiplexes communications between the network adapter board 812 and the plurality of operator stations 828 which is described in detail below in conjunction with FIG. 16. It should be understood that the LAN may be in accordance with well-known designs. The LAN improves the functional capability of the Assignee's prior art telephone answering system described above in conjunction with FIGS. 1-5 in eliminating slow speed serial communications between the host system and the operator stations which slowed down the overall operation of the system and required increased host overhead. The LAN provides much higher speed communications which frees the host system to service an increased number of operator stations. For example, in a commercial embodiment of the system described above in conjunction with FIGS. 6-13, a total of 20 operator stations may be serviced as compared to a maximum of 6 in the Assignee's prior art system as described above in conjunction with FIGS. 1-5.

The integrated private automatic branch exchange and telephone answering system 800 of FIG. 14 provides maximum flexibility in configuring a private telephone system, such as a PABX, at low cost to provide high operational speed resultant from all system functions being under common control including diverse telephony functions of the private telephone system and textual message recording with use of live operators and voice message recording. The system control software as described below in conjunction with FIG. 15, which is implemented in the host system AT compatible computer, provides maximum flexibility for software reconfiguration of the overall exchange and answering system by modification of software.

Figure 15:
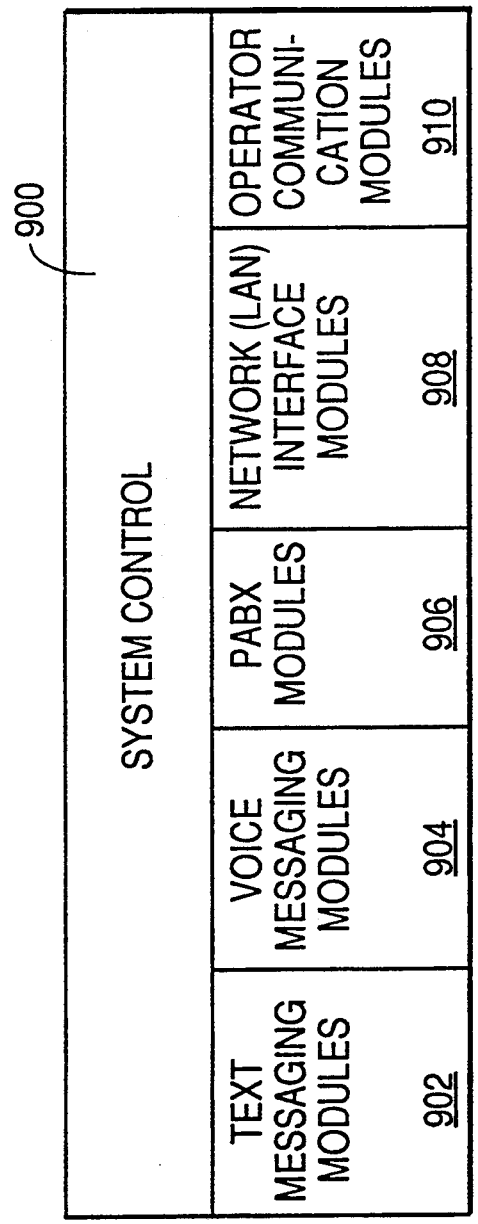
FIG. 15 is a block diagram illustrating the software utilized by the host system of FIG. 14.

FIG. 15 illustrates a preferred software platform which is implemented by the host system AT compatible computer of the PABX and answering system of FIG. 14. A system control 900 controls the calling and execution of various modules which include text messaging modules 902, voice messaging modules 904, PABX modules 906, network LAN interface modules 908 and operator communication modules 910. The system control 900 may be a single program which functions as a controller controlling each of the diverse functions described above in conjunction with FIGS. 1-13 and further, telephony functions performed by the PABX which are implemented by the PABX modules 906, interface with the LAN which controls communications between the host system and the operator stations 828 and operator communication which controls non-control functions between the operators and callers to the system. The LAN communications are control functions between the operator stations 828 and the host system. Frames 241-490 are a program for implementing the functions of the text messaging, voice messaging, network interface and operator communication modules 902, 904, 908 and 910 respectively. Software for implementing the PABX modules may be in accordance with that used by known PABXs.

Figure 16:
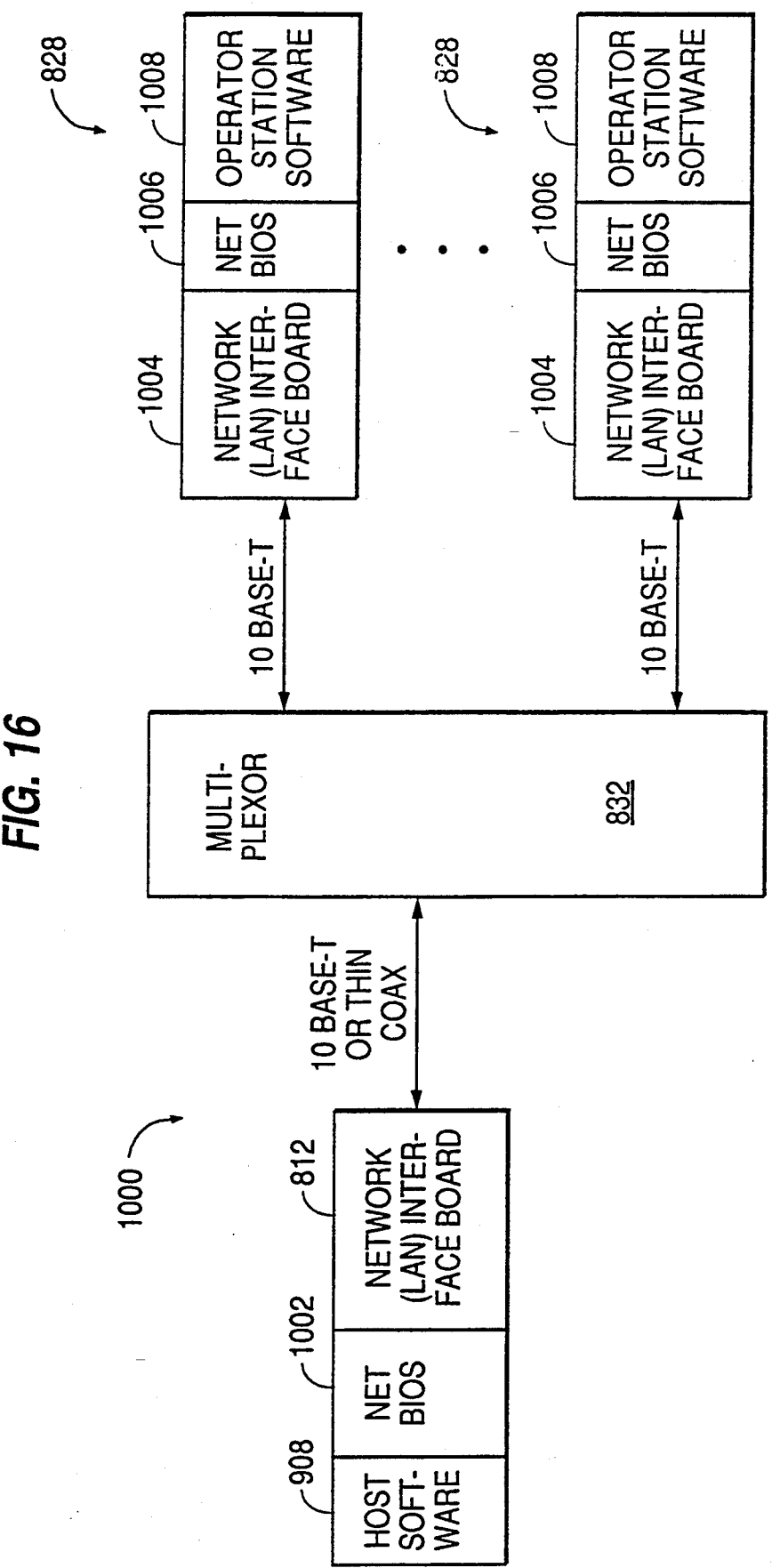
FIG. 16 illustrates a block diagram of a LAN utilized to connect the host system of FIG. 14 to a plurality of operator stations.

FIG. 16 illustrates a block diagram of the LAN 1000 for controlling communications between the host system and the plurality of operator stations 828. Host software in the form of the network interface modules 908 communicates with a network basic input/output system (BIOS) 1002. The network interface board 812 is driven by the BIOS 1002. Communications are coupled between the network interface board 812 and multiplexor 832 by any known communication medium used in LANs including 10 base-T or thin COAX. The multiplexor 832 functions to multiplex communications between the network LAN interface board 812 and a plurality of operator stations 828 each of which contain a network interface board 1004. Each operator station 828 is interfaced with the multiplexor 832 with any known communication medium such as but not limited to 10 base-T. Each operator station 828 includes a network interface board 1004, a network BIOS 1006 and operation station software 1008. The host software 908, network BIOS 1002, network interface board 812, multiplexor 832, network interface board 1004, network BIOS 1006 and operator station software 1008 may be implemented in various configurations with it being understood that the present invention is not limited to any particular implementation of these individual elements.

While the invention has been described in terms of its preferred embodiments, it should be understood that numerous modifications may be made thereto without departing from the spirit and scope of the invention as defined in the appended claims. For example, the number of information systems each having incompatible bus protocols which may be interconnected via the digital switching matrix, switches and input and output buses 12 may be varied to connect diverse types of information system. While a preferred application of the present invention is interconnecting systems configured from circuits utilizing digitized voice, it should be understood that the present invention is not limited to information encoding voice. For example other forms of pulse code modulated data or otherwise digitally encoded data may be transmitted such as data in accordance with ISDN specifications. It should be understood that the present invention is not limited to use of the particular software programs contained in the microfiche Appendix hereto or described above. With respect to FIG. 14, it should be understood that the integrated PABX and telephone answering system may be connected to the digital switching system described above with respect to FIGS. 6-13. The detailed circuitry of FIGS. 6-13 has not been illustrated in the block diagram of FIG. 14. It should be understood that the connections between the digital switching matrix board 808 and the host system to the elements of FIGS. 6-8 have been omitted to avoid complicating the illustration. Furthermore, while a preferred host system is a PC AT compatible system, it should be understood that the present invention is not limited to the use of any particular host system for controlling either the digital switching matrix, telephone answering system, or PABX and telephone answering system. It is intended that all such modifications fall within the scope of the appended claims.

We claim:

1. A private automatic branch exchange having a plurality of telephones which controls telephony functions of the telephones and a telephone answering system for providing textual messages and voice messages produced by the telephone answering system answering telephone calls to the telephones comprising:

a voice message recording system for recording voice messages provided by telephone calls to the telephones and answered by the telephone answering system;

a textual message recording system for recording textual messages provided by an operator who answers telephone calls made to the telephones which are answered by the telephone answering system;

a digital switching matrix having an input bus coupled to the public switched telephone network and an output bus with information on the input bus from the public switched telephone network being selectively connectable to the output bus in response to control signals applied to switches of the switching matrix; and a control decoding telephone calls to telephones to be answered by an operator to identify a characteristic stored in an answering system memory to be used in answering a telephone call, causing the identified characteristic to be displayed by a display at an operator station at which the operator answers the telephone call to provide the operator answering the telephone call with the characteristic for use in answering the telephone call at the operator station, controlling the recording of messages by the telephone answering system, controlling reproduction of the recorded messages to provide caller access to messages recorded by the voice message recording system and access through an operator to messages recorded by the textual message recording system, controlling operation of the exchange to control the telephony functions of the telephones, and controlling switching of the digital switching matrix to control selective connection of information from the public switched telephone network through the input bus, through the digital switching matrix to the output bus.

2. A private automatic branch exchange and telephone answering system in accordance with claim 1 wherein:

the control is under the control of a single control program.

3. A private automatic branch exchange and telephone answering system in accordance with claim 1 further comprising:

a local area network connecting a plurality of operator stations to the control for transmitting information between the control and the stations.

4. A private automatic branch exchange and telephone answering system in accordance with claim 2 further comprising:

a local area network connecting a plurality of operator stations to the control for transmitting information between the control and the stations.

5. A private automatic branch exchange and telephone answering system in accordance with claim 1 wherein:

the characteristic is information used for composing a voice sequence by the operator in answering the telephone call at the operator station.

6. A private automatic branch exchange and telephone answering system in accordance with claim 1 wherein:

the characteristic is an indication that the telephone call has occurred in response to reproduction of a voice message stored in the answering system memory.

7. A private automatic branch exchange and telephone answering system in accordance with claim 1 wherein:

the characteristic is that the telephone call is a check in telephone call when an emergency message has been recorded and any attempt to reach a person whose telephone is being answered by the answering system to deliver the emergency message has been unsuccessful.

8. A private automatic branch exchange and telephone answering system in accordance with claim 1 wherein:

the characteristic is that the telephone call is a check in telephone call.

9. A private automatic branch exchange and telephone answering system in accordance with claim 1 wherein:

the control provides a voice synthesized message summarizing textual and voice messages stored in the answering system memory.

10. A private automatic branch exchange and telephone answering system in accordance with claim 9 wherein:

the control provides the synthesized message after a caller requesting a summary has provided a security code which enables the playing of the synthesized message.

11. A private automatic branch exchange and telephone answering system in accordance with claim 9 wherein:

the control provides a caller with the choice of playing back individual voice messages.

12. A private automatic branch exchange and telephone answering system in accordance with claim 9 wherein:

the control provides a caller with a choice of requesting an operator to read back individual textual messages.

13. A private automatic branch exchange and telephone answering system in accordance with claim 1 wherein:

the decoding of the telephone call to be answered comprises decoding of digits of a number called by the telephone call which digits function as a pointer to a file in the system memory storing the characteristic.

14. A private automatic branch exchange and telephone answering system in accordance with claim 1 wherein:

the control is a computer.

15. A private automatic branch exchange and telephone answering system in accordance with claim 14 wherein:

the computer is a PC.

16. A private automatic branch exchange and telephone answering system in accordance with claim 2 wherein:

the single program is a real time multitasking program supporting multiple operators at multiple operator stations.

17. A private automatic branch exchange and telephone answering system in accordance with claim 1 wherein:

communications between the recording systems and the control are over a digital data bus of a computer.

18. A private automatic branch exchange and telephone answering system in accordance with claim 1 further comprising:
- a plurality of information systems with each information system having an information bus for transmitting and receiving information using a protocol which is different from a protocol used by the information bus of each of the other information systems with the information buses of the information systems being electrically connected to the input and the output buses of the matrix to permit information transmitted on a conductor of any of the information buses to be received by another conductor of any of the information buses through the input bus, the switching matrix and the output bus; and wherein
- the control includes a controller, coupled to each of the plurality of the information systems, for controlling the information systems with commands causing at least one of the information systems to transmit and at least one of the information systems to receive information using the information bus of the transmitting and the information bus of the receiving information systems, the switching matrix and the input and output buses, and a control processor, responsive to commands from the controller, for generating the control signals controlling switching of the switches of the digital switching matrix.

19. A private automatic branch exchange and telephone answering system in accordance with claim 18, wherein:
- information transmitted and received on the information buses is encoded in a pulse code modulation format to provide a plurality of channels of information with each channel being time division multiplexed.

20. A private automatic branch exchange and telephone answering system in accordance with claim 19, wherein:
- the channels of information contain audio voice information.

21. A private automatic branch exchange and telephone answering system in accordance with claim 19, wherein:
- at least one of the information systems is connected to a public switched telephone network and the network provides a timing reference to the switching system used to generate a master clock signal by control circuitry to control a rate of information transmission and reception on the buses by the information systems.

22. A private automatic branch exchange and telephone answering system in accordance with claim 19, wherein:
- the controller transmits commands to a plurality of the information systems and to the control processor to cause information to be transmitted from the bus of one of the information systems through the digital switching matrix for receipt by the bus of another one of the information systems.

23. A private automatic branch exchange and telephone answering system in accordance with claim 18, wherein:
- the controller transmits commands to one of the information systems and to the control processor to cause information to be transmitted and received by the bus of the information system receiving the command through the switching matrix.

24. A private automatic branch exchange and telephone answering system in accordance with claim 18, wherein:
- the controller transmits commands to at least one of the information systems and to the control processor to cause a plurality of channels of information to be transmitted from the bus of at least one of the information systems through the switching matrix to the bus of at least another one of the information systems.

25. A private automatic branch exchange and telephone answering system in accordance with claim 24, wherein:
- the controller transmits commands to a plurality of the information systems and to the control processor to cause the plurality of channels of information to be transmitted from the bus of at least one of the information systems through the switching matrix to the bus of at least another one of the information systems.

26. A private automatic branch exchange and telephone answering system in accordance with claim 18, wherein:
- the controller transmits commands to the plurality of information systems and to the control processor to cause full duplex communications between buses of at least two of the information systems through the switching matrix.

27. A private automatic branch exchange and telephone answering system in accordance with claim 18, further comprising:
- control circuitry, responsive to the control processor, for providing a master clock signal to the information systems which controls a rate of information transmission and reception on the buses by the information systems.

28. A private automatic branch exchange and telephone answering system in accordance with claim 27, wherein:
- the commands control the generation of the master clock signal with the controller commanding the information systems to control the transmission and reception of information on the information buses under the control of the master clock signal.

29. A private automatic branch exchange and telephone answering system in accordance with claim 28, wherein:
- the master clock signal is synchronized with another signal provided on one of the information buses of the information systems.

30. A private automatic branch exchange and telephone answering system in accordance with claim 28, wherein:
- the control circuitry also provides synchronization signals to the information systems which synchronize frames of information transmitted and received on the buses by the information systems.

31. A private automatic branch exchange and telephone answering system in accordance with claim 30, wherein:
- the commands control the generation of the synchronization signals with the controller commanding the information systems to synchronize the transmission and reception of frames on the information buses under the control of the synchronization signals.

32. A digital switching system comprising:
- a digital switching matrix having an input bus and an output bus with information on the input bus being selectively connectable to information on the output bus in response to control signals applied to switches of the switching matrix;
- a plurality of information systems with each information system having an information bus for transmitting and receiving information using a protocol which is different from a protocol used by the information bus of each of the other information systems with conductors of the information buses of the information systems being electrically connected to the input and the output buses of the matrix to permit information transmitted on a conductor of any of the information buses to be received by another conductor of any of the information buses through the input bus, the switching matrix and the output bus;
- a voice message recording system for recording voice messages provided by telephone calls to telephones being answered by a telephone answering system;
- a textual message recording system for recording textual messages provided by an operator who answers telephone calls made to telephones being answered by the telephone answering system;
- a host processor, coupled to each of the plurality of the information systems, decoding telephone calls to be answered by an operator to identify a characteristic stored in an answering system memory to be used in answering a telephone call, causing the identified characteristic to be displayed by a display device at an operator station at which the operator answers the telephone call to provide the operator answering the telephone call with the characteristic for use in answering the telephone call at the operator station, controlling the recording of messages by the telephone answering system and controlling reproduction of the recorded messages to provide caller access to messages recorded by the voice message recording system and access through an operator to messages recorded by the textual message recording system, controlling the information systems with commands causing at least one of the information systems to transmit and at least one of the information systems to receive information using the information bus of the transmitting and the information bus of the receiving information systems, the switching matrix and the input and output buses; and
- a control processor, responsive to commands from the host processor, for generating the control signals controlling switching of the switches of the digital switching matrix.

33. A digital switching system in accordance with claim 32, wherein:
information transmitted and received on the information buses is encoded in a pulse code modulation format to provide a plurality of channels of information with each channel being time division multiplexed.

34. A digital switching system in accordance with claim 32, wherein:
the channels of information contain audio voice information.

35. A digital switching system in accordance with claim 32, wherein:
at least one of the information systems is connected to a public switched telephone network and the network provides a timing reference to the switching system used to generate a master clock signal by control circuitry to control a rate of information transmission and reception on the buses by the information systems.

36. A digital switching system in accordance with claim 32, wherein:
the host processor transmits commands to a plurality of the information systems and to the control processor to cause information to be transmitted from the bus of one of the information systems through the digital switching matrix for receipt by the bus of another one of the information systems.

37. A digital switching system in accordance with claim 32, wherein:
the host processor transmits commands to one of the information systems and to the control processor to cause information to be transmitted and received by the bus of the information system receiving the command through the switching matrix.

38. A digital switching system in accordance with claim 32, wherein:
the host processor transmits commands to at least one of the information systems and to the control processor to cause a plurality of channels of information to be transmitted from at least one bus of one of the information systems through the switching matrix to at least one bus of at least one of the information systems.

39. A digital switching system in accordance with claim 38, wherein:
the host processor transmits commands to a plurality of the information systems and to the control processor to cause the plurality of channels of information to be transmitted from at least one information bus of one of the information systems through the switching matrix to at least one information bus of another of the information systems.

40. A digital switching system in accordance with claim 32, wherein:
the host processor transmits commands to a plurality of information systems and to the control processor to cause full duplex communications between buses of at least two of the information systems through the switching matrix.

41. A digital switching system in accordance with claim 32, further comprising:
control circuitry, responsive to the control processor, for providing a master clock signal to the information systems which controls a rate of information transmission and reception on the buses by the information systems.

42. A digital switching system in accordance with claim 41, wherein:
the commands control the generation of the master clock with the host processor commanding the information systems to control the transmission and reception of information on the information buses under the control of the master clock.

43. A digital switching system in accordance with claim 42, wherein:
the master clock is synchronized to generate the clock signal with another signal provided on one of the information buses of the information systems.

44. A digital switching system in accordance with claim 42, wherein:

the control circuitry also provides synchronization signals to the information systems which synchronize frames of information transmitted and received on the buses by the information systems.

45. A digital switching system in accordance with claim 44, wherein:
the commands control the generation of the synchronization signals with the host processor commanding the information systems to synchronize the transmission and reception of frames on the information buses under the control of the synchronization signals.

46. A digital switching system in accordance with claim 32 wherein:
the characteristic is information used for composing a voice sequence by the operator in answering the telephone call at the operator station.

47. A digital switching system in accordance with claim 32 wherein:
the characteristic is an indication that the telephone call has occurred in response to reproduction of a voice message stored in the answering system memory.

48. A digital switching system in accordance with claim 32 wherein:
the characteristic is that the telephone call is a check in telephone call when an emergency message has been recorded and any attempt to reach a person whose telephone is being answered by the answering system to deliver the emergency message has been unsuccessful.

49. A digital switching system in accordance with claim 32 wherein:
the characteristic is that the telephone call is a check in telephone call.

50. A digital switching system in accordance with claim 32 wherein:
the host processor provides a voice synthesized message summarizing textual and voice messages stored in the answering system memory.

51. A digital switching system in accordance with claim 50 wherein:
the host processor provides the synthesized message after a caller requesting a summary has provided a security code which enables the playing of the synthesized message.

52. A digital switching system in accordance with claim 50 wherein:
the host processor provides a caller with the choice of playing back individual voice messages.

53. A digital switching system in accordance with claim 50 wherein:
the host processor provides a caller with a choice of requesting an operator to read back individual textual messages.

54. A digital switching system in accordance with claim 32 wherein:
the decoding of the telephone call to be answered comprises decoding of digits of a number called by the telephone call which digits function as a pointer to a file in the system memory storing the characteristic.

55. A digital switching system in accordance with claim 32 wherein:
the controller is under the control of a single control program.

56. A private automatic branch exchange having a plurality of telephones which controls telephony functions of the telephones and a telephone answering system for providing textual messages and voice messages produced by the telephone answering system answering telephone calls to the telephones comprising:
a voice message recording system for recording voice messages provided by telephone calls to the telephones and answered by the telephone answering system;
a textual message recording system for recording textual messages provided by an operator who answers telephone calls made to the telephones which are answered by the telephone answering system;
a digital switching matrix having an input bus coupled to the public switched telephone network and an output bus with information on the input bus received from the public switched telephone network being selectively connectable to the output bus in response to control signals applied to switches of the switching matrix;
a control controlling switching of the digital switching matrix to control the selective connection of information from the public switched telephone network through the input bus, through the digital switching matrix to the output bus, controlling answering of telephone calls by the voice message recording system and by the textual message recording system, controlling the recording of messages by the voice message and textual message recording systems and controlling reproduction of the recorded messages to provide caller access to messages recorded by the voice message recording system and access through an operator to messages recorded by the textual message recording system.

57. A private automatic branch exchange and telephone answering system in accordance with claim 56 further comprising:
a plurality of information systems with each information system having an information bus for transmitting and receiving information with the information buses of the information systems being electrically connected to the input and output buses of the matrix to permit information transmitted on a conductor of any of the information buses to be received by another conductor of any of the information buses through the input bus, the switching matrix and the output bus; and wherein
the control includes a controller, coupled to each of the plurality of the information systems, for controlling the information systems with commands causing at least one of the information systems to transmit and at least one of the information systems to receive information using the information bus of the transmitting and the information bus of the receiving information systems, the switching matrix and the input and output buses, and a control processor, responsive to commands from the controller, for generating the control signals controlling switching of the switches of the digital switching matrix.

* * * * *